(12) United States Patent
Bouchard et al.

(10) Patent No.: US 7,558,925 B2
(45) Date of Patent: Jul. 7, 2009

(54) SELECTIVE REPLICATION OF DATA STRUCTURES

(75) Inventors: Gregg A. Bouchard, Round Rock, TX (US); David A. Carlson, Haslet, TX (US); Richard E. Kessler, Shrewsbury, MA (US)

(73) Assignee: Cavium Networks, Inc., Mountain View, CA (US)

( * ) Notice: Subject to any disclaimer, the term of this patent is extended or adjusted under 35 U.S.C. 154(b) by 161 days.

(21) Appl. No.: 11/335,189

(22) Filed: Jan. 18, 2006

(65) Prior Publication Data

US 2007/0038798 A1 Feb. 15, 2007

Related U.S. Application Data

(63) Continuation-in-part of application No. 11/221,365, filed on Sep. 7, 2005, now abandoned, and a continuation of application No. PCT/US2005/031803, filed on Sep. 9, 2005.

(60) Provisional application No. 60/669,655, filed on Apr. 8, 2005, provisional application No. 60/609,211, filed on Sep. 10, 2004.

(51) Int. Cl.
*G06F 12/02* (2006.01)
(52) U.S. Cl. ........................ 711/154; 711/104
(58) Field of Classification Search .............. 711/154, 711/104
See application file for complete search history.

(56) References Cited

U.S. PATENT DOCUMENTS

| | | | |
|---|---|---|---|
| 4,415,970 A | 11/1983 | Swenson et al. | |
| 4,755,930 A | 7/1988 | Wilson et al. | |
| 4,780,815 A | 10/1988 | Shiota | |
| 5,091,846 A | 2/1992 | Sachs et al. | |
| 5,119,485 A | 6/1992 | Ledbetter et al. | |
| 5,155,831 A | 10/1992 | Emma et al. | |
| 5,276,852 A | 1/1994 | Callander et al. | |
| 5,404,483 A | 4/1995 | Stamm et al. | |
| 5,408,644 A | 4/1995 | Schneider et al. | |

(Continued)

FOREIGN PATENT DOCUMENTS

GB    2378779 A    2/2003

OTHER PUBLICATIONS

Handy, Jim. "The Cache memory Book." 1998. Academic Press, Inc. Second edition. pp. 85-86.

(Continued)

*Primary Examiner*—Kevin L Ellis
*Assistant Examiner*—Jared I Rutz
(74) *Attorney, Agent, or Firm*—Hamilton, Brook, Smith & Reynolds, P.C.

(57) ABSTRACT

Methods and apparatus are provided for selectively replicating a data structure in a low-latency memory. The memory includes multiple individual memory banks configured to store replicated copies of the same data structure. Upon receiving a request to access the stored data structure, a low-latency memory access controller selects one of the memory banks, then accesses the stored data from the selected memory bank. Selection of a memory bank can be accomplished using a thermometer technique comparing the relative availability of the different memory banks. Exemplary data structures that benefit from the resulting efficiencies include deterministic finite automata (DFA) graphs and other data structures that are loaded (i.e., read) more often than they are stored (i.e., written).

21 Claims, 15 Drawing Sheets

U.S. PATENT DOCUMENTS

| | | | |
|---|---|---|---|
| 5,590,368 | A | 12/1996 | Heeb et al. |
| 5,619,680 | A | 4/1997 | Berkovich et al. |
| 5,623,627 | A | 4/1997 | Witt |
| 5,737,547 | A | 4/1998 | Zuravleff et al. |
| 5,737,750 | A | 4/1998 | Kumar et al. |
| 5,742,840 | A | 4/1998 | Hansen et al. |
| 5,754,819 | A | 5/1998 | Lynch et al. |
| 5,794,060 | A | 8/1998 | Hansen et al. |
| 5,794,061 | A | 8/1998 | Hansen et al. |
| 5,809,321 | A | 9/1998 | Hansen et al. |
| 5,822,603 | A | 10/1998 | Hansen et al. |
| 5,860,158 | A | 1/1999 | Pai et al. |
| 5,890,217 | A | 3/1999 | Kabemoto et al. |
| 5,893,141 | A | 4/1999 | Kulkarni |
| 5,897,656 | A | 4/1999 | Vogt et al. |
| 5,991,855 | A | 11/1999 | Jeddeloh et al. |
| 6,018,792 | A | 1/2000 | Jeddeloh et al. |
| 6,021,473 | A | 2/2000 | Davis et al. |
| 6,026,475 | A | 2/2000 | Woodman |
| 6,065,092 | A | 5/2000 | Roy |
| 6,070,227 | A | 5/2000 | Rokicki |
| 6,125,421 | A | 9/2000 | Roy |
| 6,134,634 | A | 10/2000 | Marshall et al. |
| 6,188,624 | B1 | 2/2001 | Zheng |
| 6,226,715 | B1 | 5/2001 | Van Der Wolf et al. |
| 6,279,080 | B1 | 8/2001 | DeRoo |
| 6,408,365 | B1 | 6/2002 | Hosomi |
| 6,438,658 | B1 | 8/2002 | Baliga et al. |
| 6,526,481 | B1 | 2/2003 | Shen et al. |
| 6,546,471 | B1 | 4/2003 | Tarui et al. |
| 6,560,680 | B2 | 5/2003 | Meyer |
| 6,563,818 | B1 | 5/2003 | Sang et al. |
| 6,571,320 | B1 | 5/2003 | Hachmann |
| 6,587,920 | B2 | 7/2003 | Mekhiel |
| 6,598,136 | B1 | 7/2003 | Norrod et al. |
| 6,622,214 | B1 | 9/2003 | Vogt et al. |
| 6,622,219 | B2 | 9/2003 | Tremblay et al. |
| 6,643,745 | B1 | 11/2003 | Palanca et al. |
| 6,647,456 | B1 | 11/2003 | Van Dyke et al. |
| 6,654,858 | B1 | 11/2003 | Asher et al. |
| 6,665,768 | B1 | 12/2003 | Redford |
| 6,718,457 | B2 | 4/2004 | Tremblay et al. |
| 6,725,336 | B2 | 4/2004 | Cherabuddi |
| 6,757,784 | B2 | 6/2004 | Lu et al. |
| 6,785,677 | B1 | 8/2004 | Fritchman |
| 6,924,810 | B1 | 8/2005 | Tishler |
| 7,055,003 | B2 | 5/2006 | Cargoni et al. |
| 7,093,153 | B1 | 8/2006 | Witek et al. |
| 7,209,996 | B2 * | 4/2007 | Kohn et al. ............... 710/305 |
| 2001/0037406 | A1 | 11/2001 | Phibrick et al. |
| 2001/0054137 | A1 | 12/2001 | Eickemeyer et al. |
| 2002/0032827 | A1 | 3/2002 | Nguyen et al. |
| 2002/0099909 | A1 | 7/2002 | Meyer |
| 2002/0112129 | A1 | 8/2002 | Arimilli et al. |
| 2003/0056061 | A1 | 3/2003 | Sherman |
| 2003/0065884 | A1 | 4/2003 | Lu et al. |
| 2003/0067913 | A1 | 4/2003 | Georgiou et al. |
| 2003/0105793 | A1 | 6/2003 | Guttag et al. |
| 2003/0110208 | A1 | 6/2003 | Wyschogrod et al. |
| 2003/0115238 | A1 | 6/2003 | O'Connor et al. |
| 2003/0115403 | A1 | 6/2003 | Bouchard et al. |
| 2003/0172232 | A1 * | 9/2003 | Naffziger ................ 711/118 |
| 2003/0212874 | A1 | 11/2003 | Alderson |
| 2004/0010782 | A1 | 1/2004 | Moritz |
| 2004/0059880 | A1 | 3/2004 | Bennett |
| 2004/0073778 | A1 | 4/2004 | Adiletta et al. |
| 2004/0250045 | A1 * | 12/2004 | Dowling ................... 712/10 |
| 2005/0114606 | A1 | 5/2005 | Matick et al. |
| 2005/0138276 | A1 * | 6/2005 | Navada et al. ............ 711/105 |
| 2005/0138297 | A1 | 6/2005 | Sodani et al. |
| 2005/0267996 | A1 | 12/2005 | O'Connor et al. |
| 2005/0273605 | A1 | 12/2005 | Saha et al. |
| 2006/0059310 | A1 | 3/2006 | Asher et al. |
| 2006/0059314 | A1 | 3/2006 | Bouchard et al. |
| 2006/0059316 | A1 | 3/2006 | Asher et al. |
| 2006/0143396 | A1 | 6/2006 | Cabot |

OTHER PUBLICATIONS

"Microsoft Computer Dictionary," 2002. Microsoft Press, Fifth Edition, p. 466.

"Double Date Rate SDRAMs operate at 4000MHz", Oct. 14, 2003.

Jouppi, Norman P., "Cache Write Policies and Performance," WRL Research Report 91/12 (1991).

Gharachorloo, Kourosh, et al., "Architecture and Design of AlphaServer GS320." Ninth International Conference on Architectural Support for Programming Languages and Operating Systems (ASPLOS-IX) (2000).

Rik van Riel, "Page replacement in Linux 2.4 memory management," Conectiva Inc., Aug. 21, 2001, pp. 1-10; http://web.archive.org/web/20010821013232/http://surriel.com/lectures/linux24-vm.html [retrieved on Jun. 5, 2007].

Stokes, Jon, "A Look at Centrino's Core: The Pentium M" "Instruction decoding and micro-op fusion," http://arstechnica.com/articles/paedia/cpu/pentium-m.ars/4, pp. 1-4, Feb. 25, 2004.

* cited by examiner

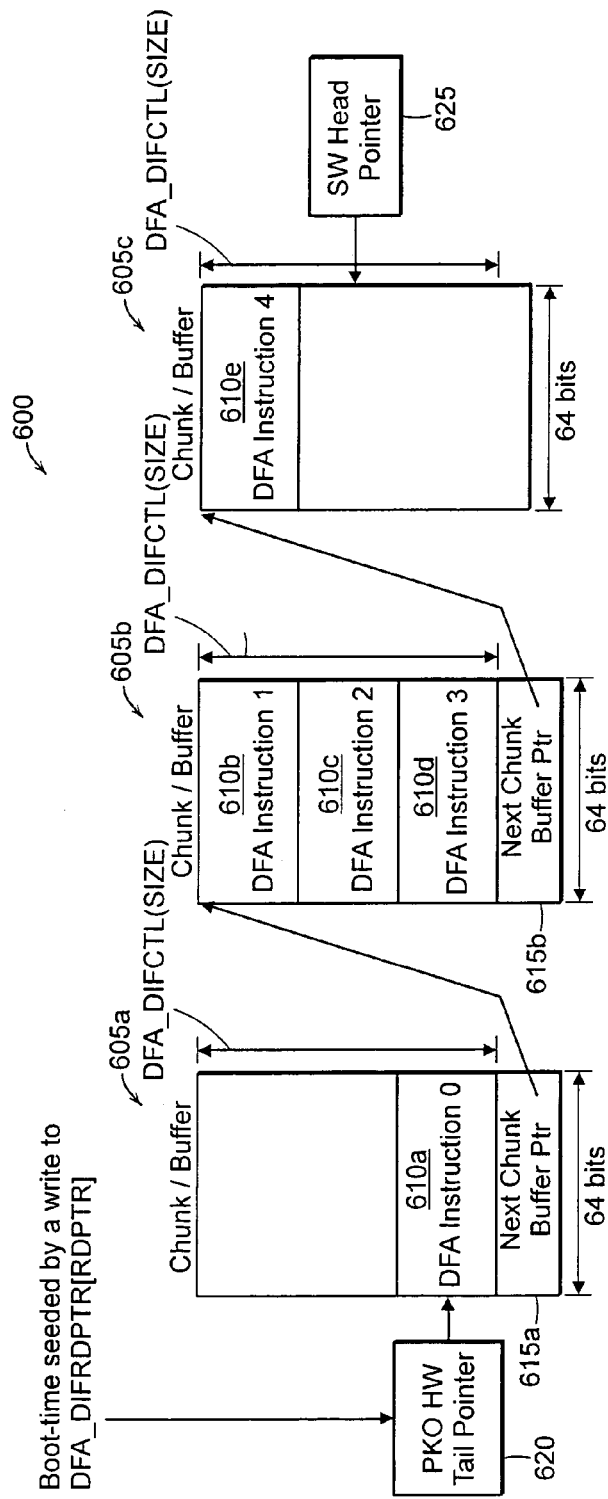
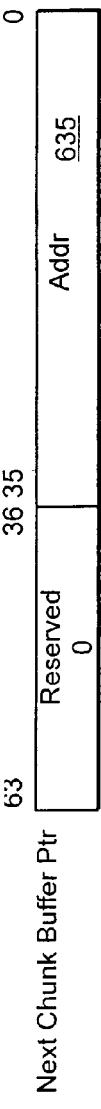
FIG. 8
FIG. 9

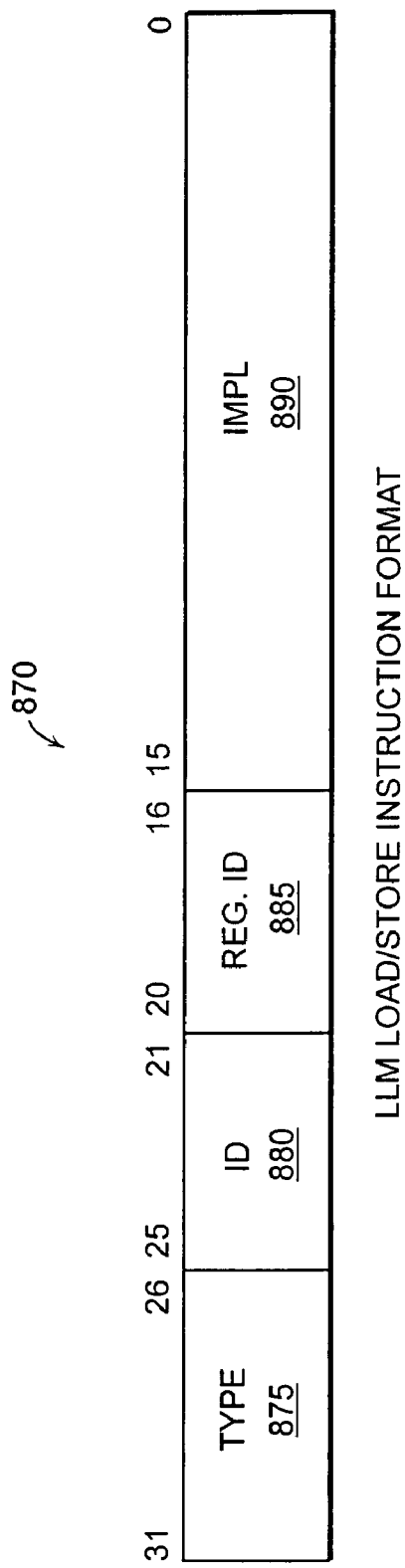
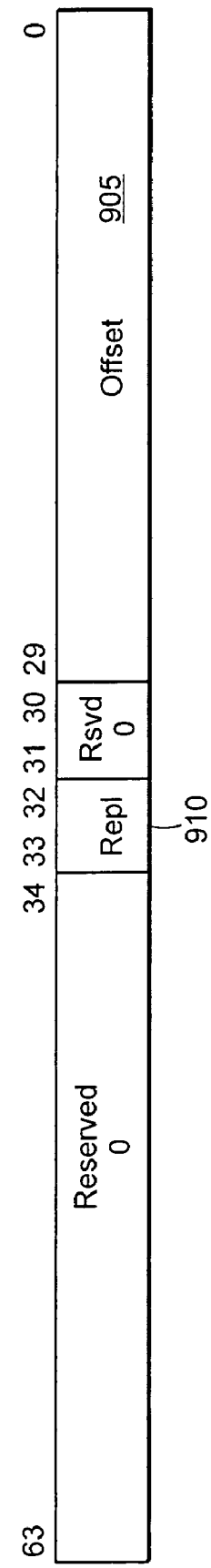
FIG. 16
FIG. 17

SELECTIVE REPLICATION OF DATA STRUCTURES

RELATED APPLICATIONS

This application is a continuation-in-part of U.S. patent application Ser. No. 11/221,365 filed Sep. 7, 2005 now abandoned and a continuation of International Application No. PCT/US2005/031803, which designated the United States and was filed on Sep. 9, 2005. The foregoing applications claim the benefit of U.S. Provisional Application No's. 60/609,211, filed on Sep. 10, 2004 and 60/669,655, filed on Apr. 8, 2005. The entire teachings of the above applications are incorporated herein by reference.

BACKGROUND OF THE INVENTION

The Open Systems Interconnection (OSI Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network Network processors are available for high-throughput L2 and L3 network protocol processing, that is, performing packet processing to forward packets at wire-speed. Typically, a general purpose processor is used to process L4-L7 network protocols that require more intelligent processing. For example, the Transmission Control Protocol (TCP)—an L4 network protocol requires several compute intensive tasks including computing a checksum over the entire payload in the packet, management of TCP segment buffers, and maintaining multiple timers at all times on a per connection basis. Although a general purpose processor can perform the compute intensive tasks, it does not provide sufficient performance to process the data so that it can be forwarded at wire-speed.

Furthermore, content-aware applications that examine the content of packets require searching for expressions, which contain both fixed strings and character classes repeated a variable number of times, in a data stream. Several search algorithms are used to perform this task in software. One such algorithm is the Deterministic Finite Automata (DFA). There can be limitations when using the DFA search algorithm, such as, exponential growth of graph size and false matches in a data stream with repeated patterns.

Due to these limitations, content processing applications require a significant amount of post processing of the results generated by pattern search. Post processing requires qualifying the matched pattern with other connection state information such as type of connection, and certain values in a protocol header included in the packet. It also requires certain other types of compute intensive qualifications, for example, a pattern match is valid only if it is within a certain position range within data stream, or if it is followed by another pattern and within certain range from the previous pattern or after/at a specific offset from the previous pattern. For example, regular expression matching combines different operators and single characters allowing complex expressions to be constructed.

SUMMARY OF THE INVENTION

The performance of content processing applications, such as those used in telecommunications and networking, generally benefit from being hosted on processors offering relatively fast processing speeds. For example, applications such as intrusion detection and prevention and anti-virus, process incoming data rapidly as it arrives to avoid delays and/or loss of data. Fast memory access is also important for applications that require a significant amount of post processing, including those that rely on results generated by pattern search. Low-latency memory devices offer one solution providing relatively fast access times. Some low-latency devices offer access times well below 100 nanoseconds. Nevertheless, when multiple access requests are made to the same data structure stored in a memory, even when it is a low-latency memory, subsequent requests for the same data structure will generally be delayed until the earlier requests are completed.

One approach for reducing delays due to overlapping access requests is to use a low-latency memory configured to include multiple memory banks. The same data can then be stored, or replicated, on more than one of the multiple memory banks. Replicating all data stored in the low-latency memory will ensure that redundant copies of the data are available to independently serve overlapping access requests thereby reducing delays. Unfortunately, low-latency memory is expensive and consequently more scarce compared to other conventional memories. Thus, replicating all stored data, depending on the application, may be impractical or even impossible. Additionally, the possibility of overlapping access requests will generally be greater for multi-processor systems in which multiple independent processors each make access requests to the same data stored in low-latency memory.

The present invention overcomes these limitations by selectively replicating data stored in a low-latency memory, such that the extent of replication is selectable. For example, the extent of replication can depend upon the importance (e.g., frequency of use) of a particular data structure. Thus, a data structure that is accessed relatively infrequently may not be replicated or replicated to a lesser extent, since the probability of overlapping access requests would be relatively low. Conversely, a data structure that is accessed relatively frequently may be replicated two or more times, since the probability of overlapping access requests would generally increase according to the frequency of use.

A low-latency memory access controller receives a request to store a data structure in low-latency memory. For example, the data structure can be a deterministic finite automata (DFA) graph. The request can be generated by software at system initialization and includes a replication factor for the data structure to be stored. The data structure is replicated according to a replication factor. Preferably, the low-latency memory is configured to include multiple memory banks, with each replication is stored in a different bank. Upon receiving a request to access the replicated data structures, once stored, the low-latency memory access controller selects one of the more than one memory banks storing a replication of the requested data structure. Once selected, the low-latency memory access controller accesses the selected memory bank. Thus, other replicated versions of the same data structure remain available to process subsequent requests for the same data structure, even while the first request is still being processed.

The replication factor is selectable and is indicative of the number of replications selected. For example, the replication factor can be 1, 2, 4, or 8 indicative of storing 1, 2, 4, or 8 copies of the data structure. The type of low-latency memory can be selected from the group consisting of dynamic random access memory (DRAM); Reduced Latency Dynamic Random Access Memory (RLDRAM); Synchronous Random Access Memory (SRAM); Fast Cycle Random Access Memory (FCRAM); and combinations thereof. In some embodiments, the replication factor is determined by software. For example, the software can track access requests to the different data structures determining a replication factor based upon the number of and/or frequency of accesses to each of the data structures. The replication factors can be stored and used the next time the data structures are loaded into low-latency memory. In some embodiments, the replication factors can be stored in non-volatile memory and used during a subsequent system reboot.

In selecting which ones of the more than one memory banks to use, the low-latency memory access controller determines the current usage of each of the memory banks. In some embodiments, the low-latency memory access controller includes a respective queue for each of the multiple memory banks. The low-latency memory access controller then uses a thermometer technique to compare the size of the different queues determining which memory banks are available, or less used. For example, each memory bank is provided with a respective queue. The number of queued instructions among multiple memory banks storing replications of a requested data structure can then be compared, the memory bank with the least number of queued instructions being selected. Thus, with the number of queued instructions being considered as the value of a thermometer, a thermometer having the lowest value can be selected to increase the likelihood that the low-latency memory access request is served with minimal delay.

In some embodiments, the low-latency memory access controller is coupled to the low-latency memory through more than one low-latency memory (LLM) access bus. For example, a low-latency memory including sixteen individual memory banks can be coupled to the low-latency memory access controller using two LLM access busses. Having the memory banks distributed among multiple busses adds further enhancements. Overlapping accesses to replications of the same data structure stored in different memory banks may still result in a conflict if the different memory banks are coupled using the same bus. Redundant busses reduce the possibility of bus collisions and delays. In one configuration, a first eight memory banks are coupled using a first LLM access bus and a second eight memory banks are coupled using a second LLM access bus. When replicating the storage of a data structure in the low-latency memory, at least some of the replications are stored on memory banks connected to the low-latency memory controller on different access busses.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 illustrates one embodiment of a DFA instruction queue as implemented in the Level-2 DRAM of FIGS. 2 and 4 according to the principles of the present invention;

FIG. 9 illustrates in more detail one embodiment of the next-chunk buffer pointer shown in FIG. 8;

FIG. 16 illustrates an exemplary low-latency memory load/store instruction format according to the principles of the present invention;

FIG. 17 illustrates an exemplary low-latency address format according to the principles of the present invention.

DETAILED DESCRIPTION OF THE INVENTION

A description of preferred embodiments of the invention follows.

Methods and apparatus are provided for accessing a low-latency memory in an efficient manner by selectably replicating a data structure within the memory. The memory includes multiple individual memory banks configured to store replicated copies of the same data structure. Upon receiving a request to access the stored data structure, a low-latency memory access controller selects one of the memory banks, accessing the stored data from the selected memory bank. Selection of a memory bank can be accomplished using a thermometer technique comparing the relative availability of the different memory banks. Exemplary data structures that benefit from the resulting efficiencies include deterministic finite automata and other data structures that are loaded (i.e., read) more often than they are stored (i.e., written).

Figure 1:
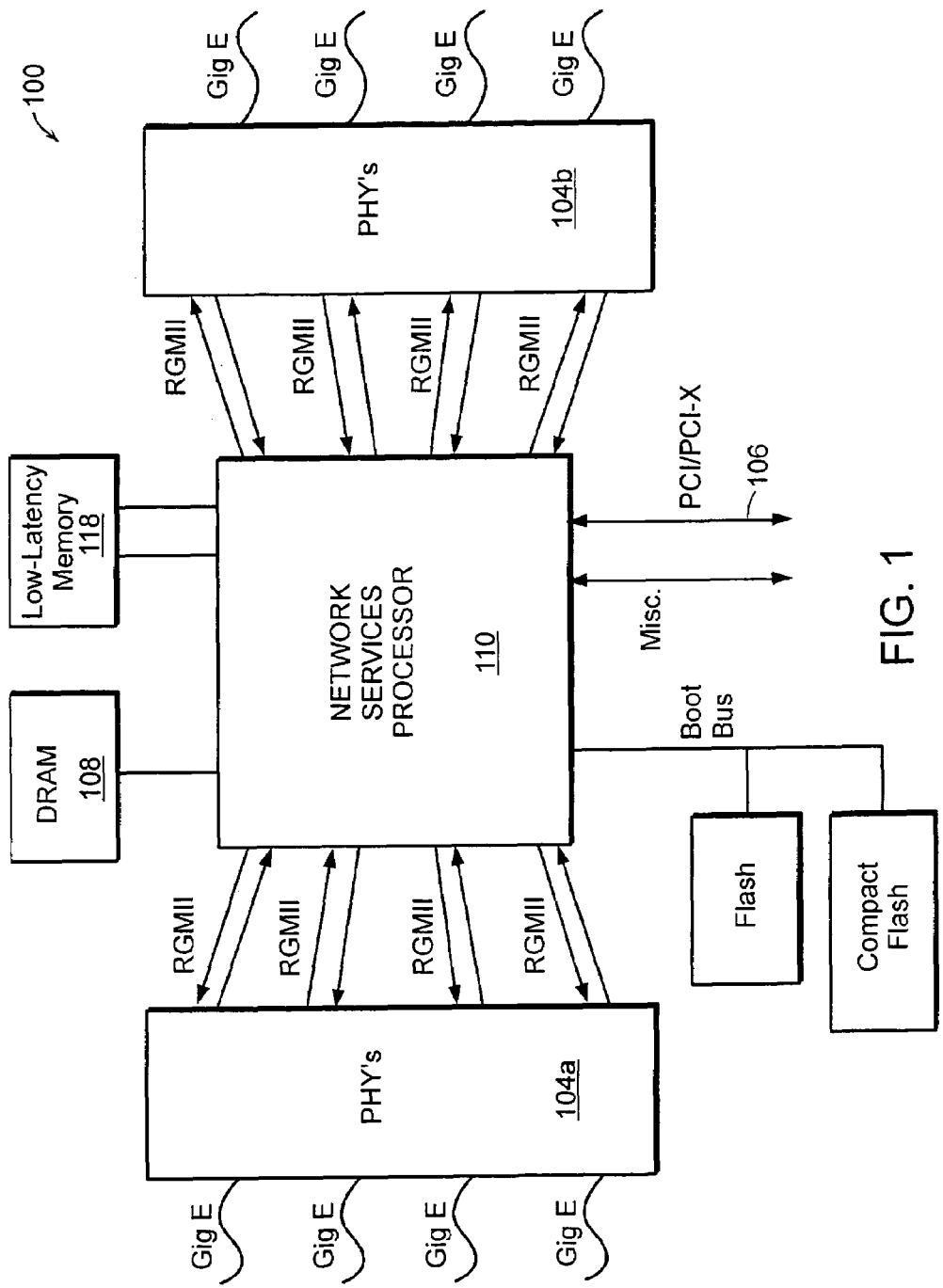
FIG. 1 is a block diagram of a network service processing system including a network services processor according to the principles of the present invention.

FIG. 1 is a block diagram of a security appliance 100 including a network services processor 110 according to the principals of the present invention. The security appliance 100 is a standalone system that can switch packets received at one Ethernet port (Gig E) to another Ethernet port (Gig E) and perform a plurality of security functions on received packets prior to forwarding the packets. For example, the security appliance 100 can be used to perform security processing on packets received on a Wide Area Network (WAN) prior to forwarding the processed packets to a Local Area Network (LAN).

The network services processor 110 provides hardware packet processing, buffering, work scheduling, ordering, synchronization, and cache coherence support to accelerate all packet processing tasks. The network services processor 110 processes Open System Interconnection network L2-L7 layer protocols encapsulated in received packets.

The network services processor 110 receives packets from the Ethernet ports (Gig E) through physical (PHY) interfaces 104a, 104b, performs L7-L2 network protocol processing on the received packets and forwards processed packets through the physical interfaces 104a, 104b, or through a Peripheral Component Interconnect (PCI) bus 106. The network protocol processing can include processing of network security protocols such as Firewall, Application Firewall, Virtual Private Network (VPN) including IP Security (IPSEC) and/or Secure Sockets Layer (SSL), intrusion detection system, and anti-virus.

A Dynamic Random Access Memory (DRAM) controller in the network services processor 110 controls access to a DRAM 108 coupled to the network services processor 110. In some embodiments, the DRAM 108 is external to the network services processor 110. The DRAM 108 stores data packets received from the PHY interfaces 104a, 104b or the PCI interface 106 for processing by the network services processor 110. The PCI interfaces 106 can be PCI Extended (PCI-X) interfaces 106.

A low-latency memory controller in the network services processor 110 controls Low-Latency Memory (LLM) 118. The LLM 118 can be used for Internet Services and Security applications allowing fast lookups, including regular-expression matching that may be required for intrusion-detection-system or anti-virus applications.

Regular expressions are a common way to express string matching patterns. The atomic elements of a regular expression are the single characters to be matched. These can be combined with meta-character operators that allow a user to express concatenation, alternation, kleene-star, etc. Concatenation is used to create multiple character matching patterns from a single charters (or sub-strings) while alternation (|) is used to create patterns that can match any of two or more sub-strings. Use of kleene-star (*) allows a pattern to match zero (0) or more occurrences of the pattern in a string. Combining different operators and single characters allows complex expressions to be constructed. For example, the expression (th(is|at)*) will match: th; this; that; thisis; thisat; thatis; thatat; etc.

Figure 2:
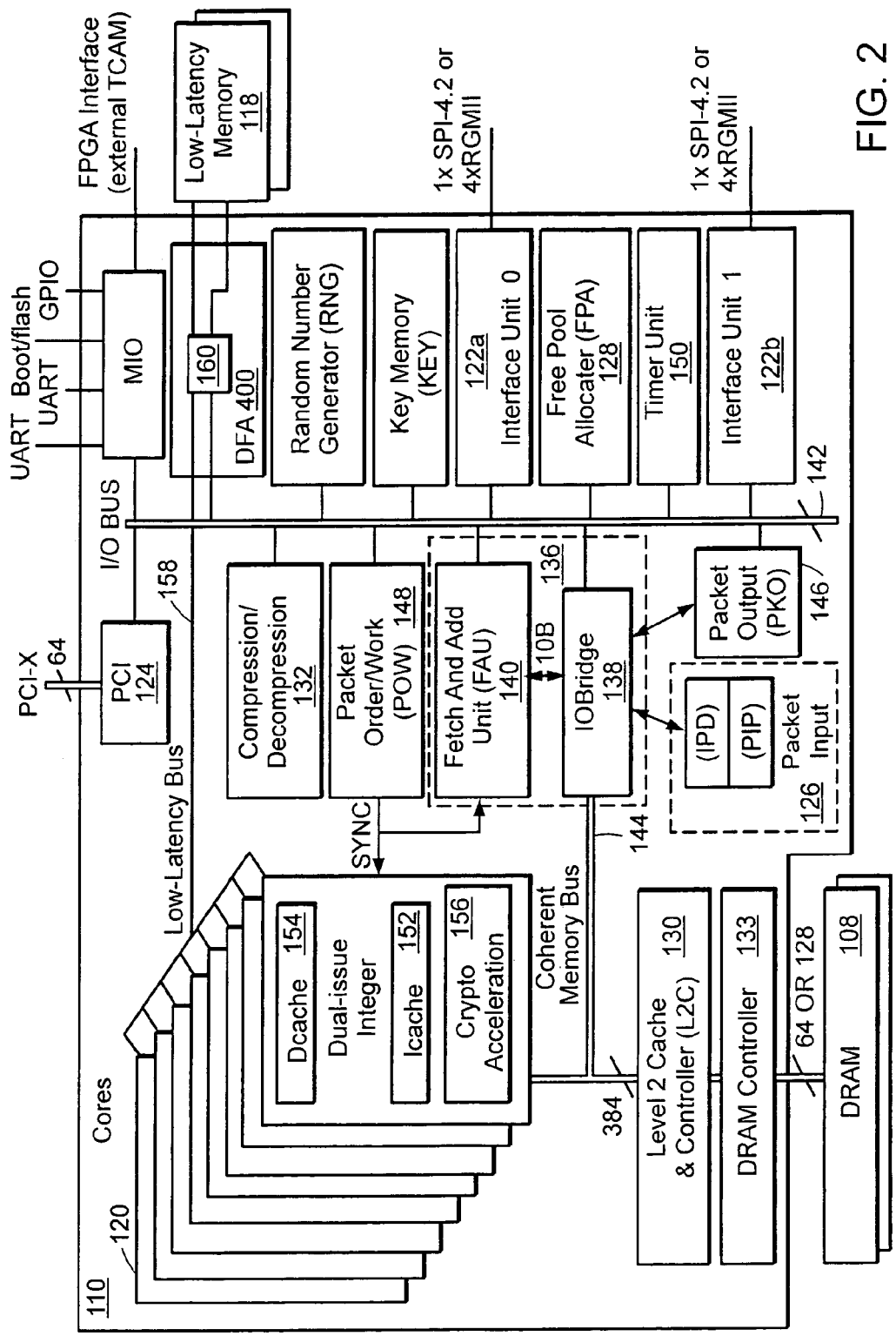
FIG. 2 is a more detailed block diagram of one embodiment of the network services processor shown in FIG. 1.

FIG. 2 is a block diagram of the network services processor 110 shown in FIG. 1. The network services processor 110 delivers high application performance using at least one processor core 120 as described in conjunction with FIG. 1.

A packet is received for processing by an interface unit, such as any one of the GMX/SPX units 122a, 122b through an SPI-4.2 or RGM II interface. A packet can also be received by a PCI interface 124. The GMX/SPX unit (122a, 122b) performs pre-processing of the received packet by checking various fields in the L2 network protocol header included in the received packet and then forwards the packet to a packet input unit 126.

The packet input unit 126 performs further pre-processing of network protocol headers (e.g., L3 and L4 headers) included in the received packet. The pre-processing includes checksum checks for TCP/User Datagram Protocol (UDP) (L3 network protocols).

A free-pool allocator 128 maintains pools of pointers to free memory in Level-2 cache memory 130 and external DRAM 108. The packet input unit 126 uses one of the pools of pointers to store received packet data in Level-2 cache memory 130 or external DRAM 108 and another of the pools of pointers to allocate work queue entries for the processor cores 120.

The packet input unit 126 then writes packet data into buffers in Level-2 cache 130 or external DRAM 108. Preferably, the packet data is written into the buffers in a format convenient to higher-layer software executed in at least one of the processor cores 120. Thus, further processing of higher level network protocols is facilitated.

The network services processor 110 can also include one or more application specific co-processors. These co-processors, when included, offload some of the processing from the processor cores 120, thereby enabling the network services processor 110 to achieve high-throughput packet processing. For example, a compression/decompression co-processor 132 is provided that is dedicated to performing compression and decompression of received packets. In one embodiment, referring to FIG. 2, a DFA unit 400 is provided including dedicated DFA thread engines adapted to accelerate pattern and/or signature matching necessary for anti-virus, intrusion-detection systems and other content-processing applications. Using a DFA unit 400, pattern and/or signature matching is accelerated, for example being performed at rates up to 4 gigabits-per-second.

An I/O interface 136 manages the overall protocol and arbitration and provides coherent I/O partitioning. The I/O interface 136 includes an I/O bridge 138 and a fetch-and-add unit 140. Registers in the fetch-and-add unit 140 are used to maintain lengths of the output queues that are used for forwarding processed packets through a packet output unit 146. The I/O bridge 138 includes buffer queues for storing information to be transferred between a coherent memory bus 144, an I/O bus 142, the packet-input unit 126, and the packet-output unit 146.

A packet-order/work module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the packet-order/work module 148. The packet-order/work module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto-acceleration 156. In one embodiment, the network services processor 110 (FIG. 1) includes sixteen superscalar Reduced Instruction Set Computer (RISC)-type processor cores 120. In some embodiments, each of the superscalar RISC-type processor cores 120 includes an extension of the MIPS64 version 2 processor core.

Level-2 cache memory 130 and external DRAM 108 are shared by all of the processor cores 120 and I/O co-processor devices (e.g., compression/decompression co-processor 132). Each processor core 120 is coupled to the Level-2 cache memory 130 by the coherent memory bus 144. The coherent memory bus 144 is a communication channel for all memory and I/O transactions between the processor cores 120, the I/O interface 136, the Level-2 cache memory 130, and a Level-2 cache memory controller 131. In one embodiment, the coherent memory bus 144 is scalable to 16 processor cores 120, supporting fully-coherent Level-1 data caches 154 with write through. Preferably the coherent memory bus 144 is highly-buffered with the ability to prioritize I/O.

The Level-2 cache memory controller 131 maintains memory reference coherence. It returns the latest copy of a block for every fill request, whether the block is stored in Level-2 cache memory 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a DRAM controller 133 supports up to 16 megabytes of DRAM 108. Preferably, the DRAM controller 133 supports either a 64-bit or a 128-bit interface to the DRAM 108. Additionally, the DRAM controller 133 can supports preferred protocols, such as the DDR-I (Double Data Rate) and DDR-II protocols.

After a packet has been processed by the processor cores 120, the packet output unit 146 reads the packet data from memory 130, 108, performs L4 network protocol post-processing (e.g., generates a TCP/UDP checksum), forwards the packet through the GMX/SPX unit 122a, 122b and frees the L2 cache 130/DRAM 108 used by the packet.

A low-latency memory controller 160 manages in-flight transactions (loads/stores) to/from the low-latency memory 118. Preferably, the low-latency memory 118 is shared by all of the processor cores 120. Memory latency refers to the time taken to satisfy a memory request initiated by the processor core 120. Low-latency memory 118 can provide sub-microsecond latency. Exemplary types of low-latency memory include DRAM, Reduced Latency Dynamic Random Access Memory (RLDRAM), Synchronous Random Access Memory (SRAM), Fast Cycle Random Access Memory (FCRAM), or any other type of low-latency memory known in the art. For example, the RLDRAM provides a memory latency of about 30 nanoseconds or less. Each processor core 120 is directly coupled to the low-latency memory controller 160 of the DFA unit 400 by a Low-Latency Memory (LLM) bus 158. The LLM bus 158 is a communication channel for content-aware application processing between the processor cores 120 and the low-latency memory controller 160. The DFA unit 400 is coupled between the processor cores 120 and the low-latency memory 118 for controlling access to the low-latency memory 118.

Figure 3:
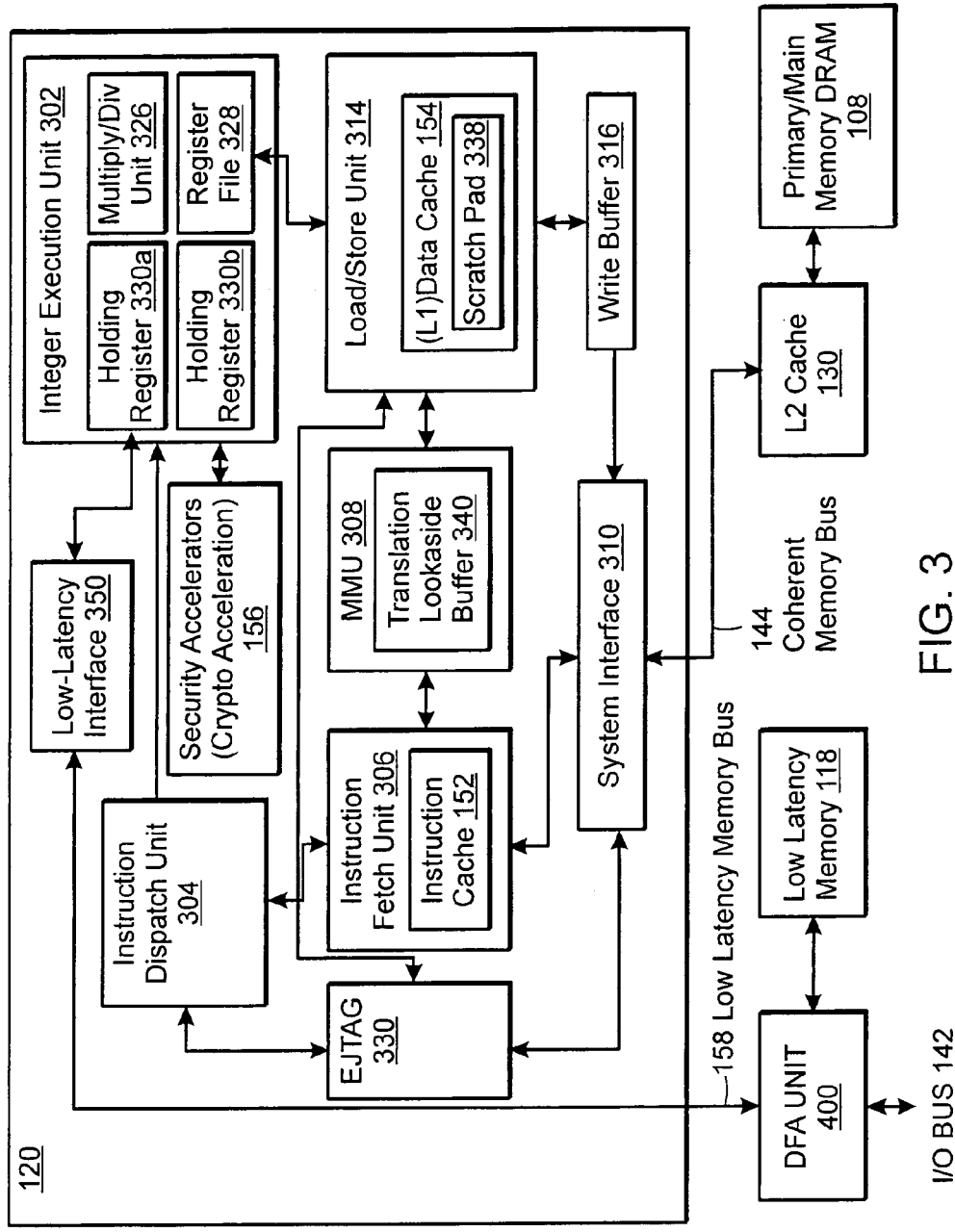
FIG. 3 is a more detailed block diagram of one embodiment of one of the Reduced Instruction Set Computing (RISC) cores shown in FIG. 2 according to the principles of the present invention.

FIG. 3 is a more detailed block diagram of one of the RISC processors 120 according to the principles of the present invention. The processor core 120 includes an integer-execution unit 302, an instruction-dispatch unit 304, an instruction-fetch unit 306, a memory-management unit 308, a system interface 310, a low-latency interface 350, a load/store unit 314, a write buffer 316, and one or more security accelerators 156. In some embodiments, the processor core 120 also includes a debugger interface 330 (e.g., an EJTAG interface) allowing debug operations to be performed. The system interface 310 controls processor access to external memory. External memory is external to the respective processor 120. For example, external memory can be located on the same device, such as on the same semiconductor substrate as the processor core 120. Alternatively or in addition, external memory can be external to the processor device, such as on a motherboard, or even on a different module altogether. External memory can include the Level-2 cache memory 130, the primary/main memory (i.e., external DRAM 108), and combination of the Level-2 cache memory 130 and main memory 108.

The integer-execution unit 302 generally includes a multiply unit 326, at least one register file (main register file) 328, and two holding registers 330a, 330b. The holding registers 330a, 330b are used to temporarily store data that is to be written to the low-latency memory 118 as well as data that has been read from the low-latency memory 118. The data is transferred between the processor core 120 and the low-latency memory 118 using low-latency-memory load/store instructions according to the principles of the present invention. Additionally, holding registers 330a, 330b improve the efficiency of an instruction pipeline by allowing two outstanding loads prior to stalling the pipeline. Although two holding registers are shown, one or more than two holding registers may also be used.

In some embodiments, the multiply unit 326 can provide a 64-bit register-direct multiply. Preferably, the instruction-fetch unit 306 includes instruction cache (ICache) 152 for locally storing preferred instructions. Additionally, the load/store unit 314 includes a data cache 154. In one embodiment, the instruction cache 152 provides 32 kilobytes of storage capacity, the data cache 154 provides 8 kilobytes, and the write buffer 316 provides 2 kilobytes. In some embodiments, the memory-management unit 308 includes a translation lookaside buffer 340 to further enhance computing speed.

In some embodiments, the processor core 120 includes a crypto-acceleration module (security accelerator) 156 that includes cryptography acceleration. Cryptography acceleration is generally provided by one or more cryptographic algorithms. Exemplary algorithms include Triple Data Encryption standard (3DES), Advanced Encryption Standard (AES), Secure Hash Algorithm (SHA-1), Message Digest Algorithm number5 (MD5). The crypto-acceleration module 156 communicates through moves to-and-from the main register file 328 in the execution unit 302. Some algorithms, such as the R5A and the Diffie-Hellman (DH) algorithms are performed in the multiply/divide unit 326. Algorithms such as these can be memory intensive, for example, requiring numerous accesses to stored lookup tables. Performance of memory intensive algorithms such as these is enhanced by using low-latency memory 118 to store and retrieve the data relied upon by the algorithms. Overall system performance can be further enhanced by coupling the low-latency memory 118 to the processors 120 using the dedicated LLM bus 158.

The DFA unit 400 includes a low-latency memory controller 160 for interfacing to the low-latency memory 118. The type of controller depends upon the type of low-latency memory used. For example, external low-latency memory 118 can include DRAM parts, such as reduced-latency DRAM (RLDRAM) available from Micron Technology of Boise, Idaho.

Figure 4:
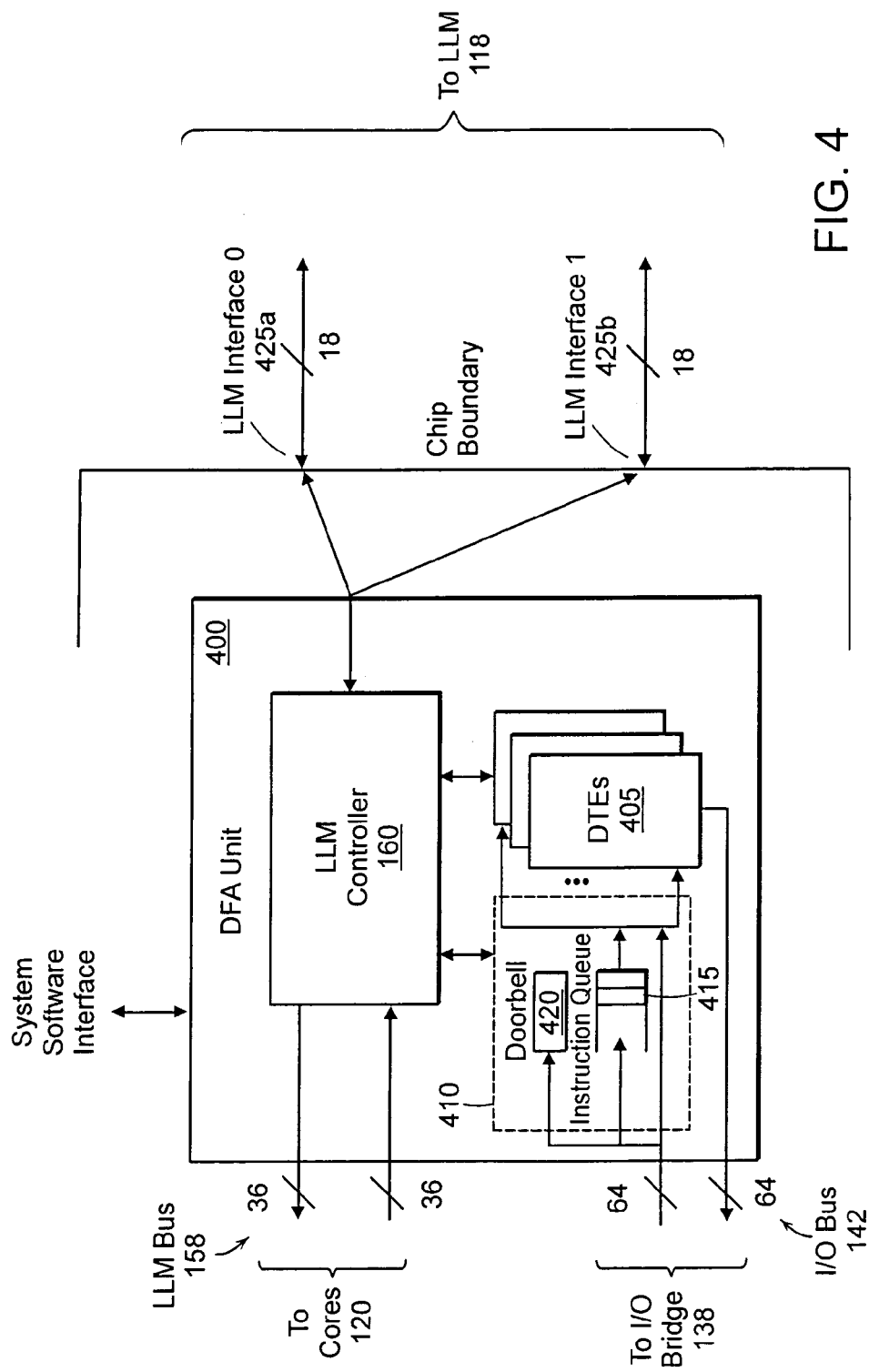
FIG. 4 illustrates a block diagram of one embodiment of the DFA unit shown in FIG. 2 and FIG. 3 according to the principles of the present invention.

A block diagram of an exemplary DFA unit 400 is illustrated in FIG. 4. The DFA unit 400 includes three primary components: a low-latency memory (LLM) controller 160 for controlling access to and from the low-latency memory 118, one or more DFA thread engines 405 for traversing the DFA graphs stored in the low-latency memory 118, and an instruction input unit 410 through which access to the DFA graphs is obtained. Preferably, the DFA unit 400 includes more than one DFA thread engine 405 to further enhance system performance by supporting substantially concurrent access to the stored DFA graphs. Generally, the DFA thread engines 405 are substantially identical and interchangeable. In an exemplary embodiment, the DFA unit 400 includes sixteen DFA thread engines 405 capable of traversing up to sixteen independently-stored graphs in the low-latency memory 118, with one DFA thread engine 405 being used for each of the stored graphs. Depending on the redundancy, at least some of the independently-stored graphs may be replicated copies of other graphs.

The DFA unit 400 is coupled to the external low-latency memory 118 through a suitable interface, referred to as the LLM interface 425. In some embodiments, multiple LLM interfaces are provided. Each interface 425 is coupled to low-latency memory 118 through a respective LLM access bus. Preferably, the DFA unit 400 includes more than one LLM interface 425 coupled to the low-latency memory 118 using a respective LLM access bus to support simultaneous access to the low-latency memory 118. Thus, while one of the more than one interfaces 425 is busy serving a first memory access request, one of the other interfaces 425 remains available to serve another request. In the exemplary embodiment, the DFA unit 400 includes two low-latency DRAM interfaces 425a, 425b (generally 425), each including 18 data bits. As is well known to those skilled in the art, an interface to memory includes data bits to be read-from or written-to memory, address bits indicating the location in memory within which the data are stored, and control bits, such as chip select bits, clocks, read/write enable bits, and bank select bits.

The DFA unit 400 is also coupled to main memory 130, 108 through the I/O bridge 138 and the I/O bus 142. Still further, the DFA unit 400 is coupled to the one or more processor cores 120 using yet another interface. For example, the DFA unit 400 includes an interface to a Low-Latency Memory LLM bus 158 for dedicated, direct access between the DFA unit 400 and the processor cores 120. Because the LLM bus 158 is separate from the main I/O bus 142, it will generally not be preoccupied serving access requests for other parts of the system, thereby further enhancing access speed to and from the low-latency memory 118. Additionally, by using a dedicated LLM bus 158, the operating protocol can be simplified again improving overall performance speed. This is in contrast to a shared system bus, such as the I/O bus 142, that generally uses a contention-based access protocol (i.e., if the bus 142 is busy serving a bus transaction, a new request will be denied or at least delayed until the bus 142 is available).

Preferably the data rate of the external LLM interfaces 425 is relatively high-speed to facilitate rapid transfer of data. For example, the data rate of the external, LLM interface 425 can be equal to the clock rate of the processor cores 120. Using such a high-speed interface 425, the LLM controller 160 can manage many in-flight transactions to one or more of the available memory banks within the external low-latency memory 118. As described in more detail below, the DFA unit 400 also performs automatic bank replication to minimize bank conflicts.

In the exemplary embodiment, the LLM controller 160 can architecturally support up to 1 gigabyte of attached low-latency memory 118 from any combination of LLM interfaces 425. The LLM bus 158 connects directly to the processor cores 120 thereby providing the processor cores 120 with a very-fast access path to the low-latency memory 118. In the exemplary embodiment, individual processor core operations can be either 36-bit or 64-bit loads/stores.

Content-aware application processing, such as cryptography processing, may utilize patterns and/or expressions (data). The patterns and/or expressions may be referenced repeatedly and are preferably stored in the low-latency memory 118. The patterns and/or expressions may be arranged according to a preferred data structure, such as in the form of a specialized state machine referred to as a DFA. Inputs to the DFA are string expressions that can be formed by one or more (8-bit) bytes. The alphabet for such a DFA is a byte. Each input byte causes the state machine of the DFA to transition from one state to the next. The states and the transition function can be represented by a graph.

Figure 5A:
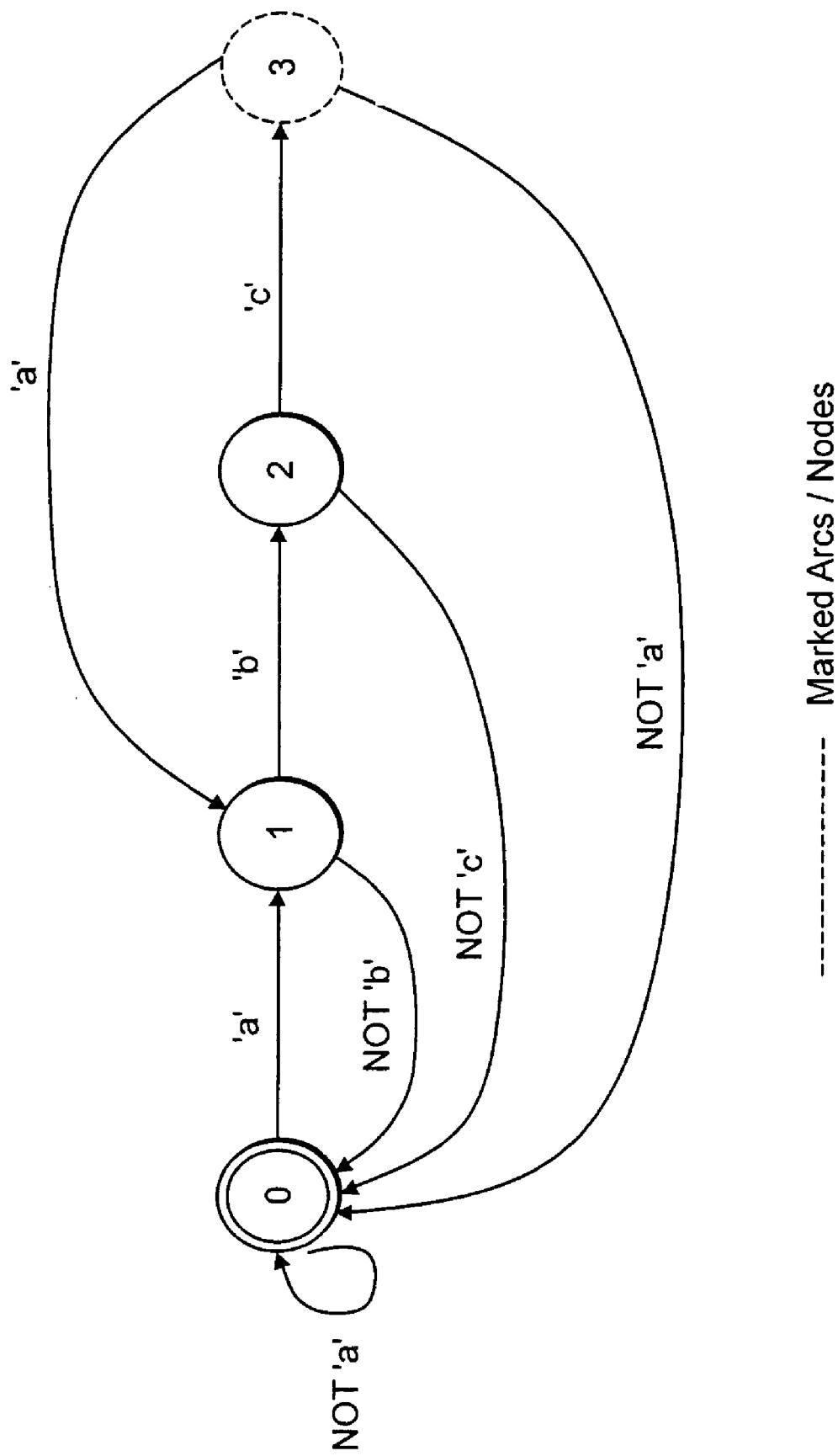
FIGS. 5A and 5B are schematic diagrams of exemplary DFA graphs.
Figure 5B:
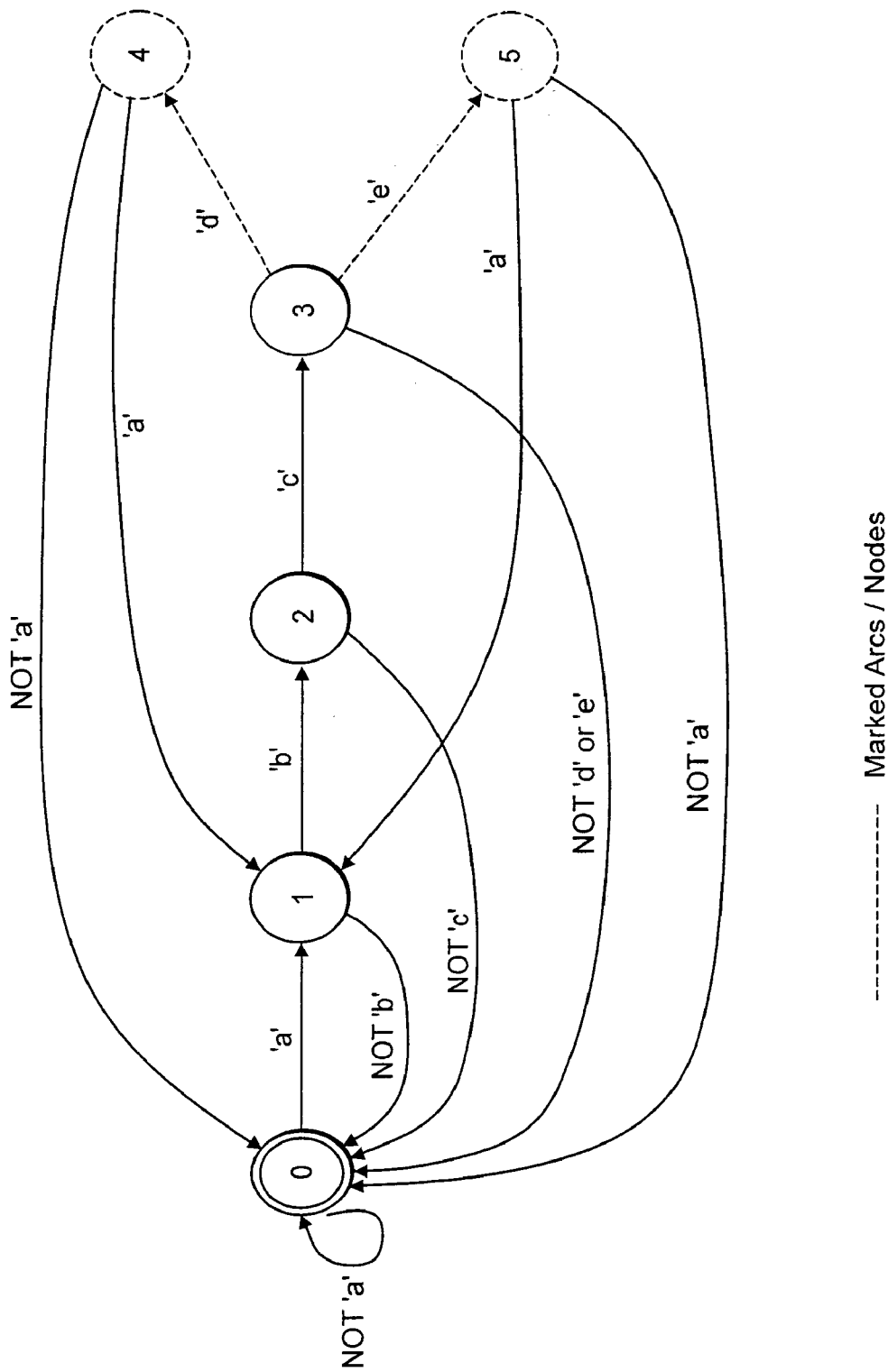

In general, a DFA can be represented as a graph, or model, including multiple nodes interconnected by arcs as shown in FIGS. 5A and 5B. Each graph node represents a respective state of the state machine and the different graph arcs represent state transitions between the interconnected nodes. The current state of the state machine is a node identifier that selects a particular node of the graph. The selection of a particular arc is determined by input bytes to the state machine (e.g., the DFA). Thus, given a state defining a first node and input bytes, the state transitions from the first node to a second node along an arc corresponding to the input bytes. In some instances, the first and second nodes are the same. The number of nodes can range from a few nodes up to about 128,000 nodes for a small graph size. Larger graph sizes can have up to 1,000,000 nodes or even more.

The DFA thread engines 405 can be used for performing pattern searches. In the illustrative examples of FIGS. 5A and 5B, the DFA graph 500 is designed to search for the target string expression 'abc. Thus, the DFA graph is used to search the input data for an exact match to the string of characters 'abc.' This expression is a fixed-length expression, such that the number of nodes and thus the depth of the graph is known (i.e., fixed).

To create the DFA graph 500, the expression is parsed and a compiler creates a root node (i.e., node '0') adding nodes 1-3 to the graph for the intended expression (i.e., one additional node for each character of the target string of characters). Continuing with this example, an exemplary input stream of characters contains a string '. . . 12abc3 . . . ' The input string is searched using the DFA graph to identify the target string expression 'abc.'

The initial state of the DFA graph is node '0.' Each character, or byte, is sequentially read and the DFA remains at node 0, until the first character of the target string expression is read. For example, upon detecting the first character 'a' of the target string expression in the input stream, an arc labeled 'a' is followed, transitioning the state from node 0 to node 1. The next character of the input stream is read. If it is anything other than the next character of the target string expression (i.e., 'b') is detected, an arc labeled 'not b' is followed from node 1 back to node 0. However, upon detecting the character 'b' as the next character in the input stream, an arc labeled 'b' is followed from node 1 to node 2. The next character of the input stream is read. If it is anything other than the next character of the target string expression (i.e., 'c'), an arc labeled 'not c' is followed from node 2 back to node 0. At node 2, however, upon detecting the character 'c' in the input stream, an arc labeled 'c' is followed from node 2 to node 3. As the target string expression 'abc' is a fixed-length expression, node 3 is a terminal node and the result of the search is reported.

In another example illustrated in FIG. 5B, the graph of the previous example is extended to find one or more occurrences of two strings 'abcd' OR 'abce.' Thus, two additional nodes, Nodes 4 and 5, are added, one node for the fourth character of each string (e.g., Node 4 for 'd' and Node 5 for 'e'). Nodes 4 and 5 are connected to Node 3, as shown, as the first three characters are the same for either string. Preferably, all occurrences of either string are identified on a single "pass" through the input string.

An exemplary input string, such as the string 'xwabcd454abceabcdsfk,' is run through the DFA yielding three "marked" transitions as a result. The marked transitions would occur at the end of the string segments located within the input string (e.g., one at each position where a 'd' or 'e' is present). Thus, three marked transitions indicate that three strings were found. The first and last marks show the transition from Node 3 to Node 4, indicating the presence and location of the string 'abcd' within the input string (i.e., DTE byte=5, previous 3, next 4 and DTE Byte 17, previous=3, next=4). The middle marked node shows the transition from Node 3 to Node 5, indicating the presence of the string 'abce' within the input string (i.e., DTE Byte=13, previous=3, next=5).

Other, more complicated DFA graphs can be similarly created by parsing one or more intended expressions with the compiler creating suitable nodes of the graph as required by the intended expressions. Thus, a single graph can be used to search for multiple expressions that may be fixed length, variable length, and combinations of fixed and variable length.

Each of the DFA thread engines 405 is capable of traversing nodes of a respective DFA graph stored in the low-latency memory 118. Generally, the DFA thread engines 405 are state machines that can be implemented using hardware, software, or combinations of hardware and software. In some embodiments, the DFA thread engines 405 are implemented in hardware using combinational logic. In other embodiments each of the DFA thread engines 405 is respectively implemented on a different processor. In still other embodiments, the DFA thread engines 405 are implemented using a common processor. For example, each of the DFA thread engines 405 can be a separate task (i.e., sequence of instructions) running on a common processor adapted to provide a shared, multitasking environment. Multitasking is a technique used in an operating system to share a single processor between several independent jobs (i.e., DFA thread engines 405). Alternatively or in addition, each of the DFA thread engines 405 can be a separate process thread running on a common processor adapted to provide a multithreading capability. Multithreading differs from multitasking in that threads generally share more of their environment with each other than do tasks under multitasking. For example, threads may be distinguished by the value of their program counters and stack pointers while sharing a single address space and set of global variables.

In operation, processor cores 120 submit DFA instructions to a DFA instruction queue 415 (FIG. 4). For example, the DFA instruction queue 415 is maintained in main memory 130, 108. The DFA instructions identify which packet data to use and which DFA graph to traverse. The packet data is generally stored in main memory 130, 108; whereas, the DFA graph is stored in low-latency memory 118. In operation, the DFA unit 400 sequentially fetches instructions from the instruction queue 415, scheduling each of the fetched instructions to one of the available DFA thread engines 405. In response to receiving a DFA instruction, the DFA thread engine 405 accesses data in main memory 130, 108, if necessary, and directs access requests toward the low latency memory 118 using the data retrieved from main memory 130, 108. The low-latency memory requests are stored in a queue, one queue being associated with each of the memory banks in the low-latency memory. The LLM controller 160 implements the queued low-latency memory access requests. By providing DFA thread engines 405 that are identical and equivalent, any instruction may be scheduled to any one of the multiple DFA thread engines 405. Any of the available DFA thread engines 405 can receive the next queued instruction from the instruction queue.

In response to receiving one of the queued instructions, the DFA thread engine 405 simultaneously:

a. fetches input packet data (i.e., input bytes) from main memory 130, 108 via the I/O bus 142, the fetched bytes being used to transition between states of the DFA graph;
b. issues a low-latency-memory load instruction per byte of packet data to traverse to the next DFA graph state for the byte; and
c. writes intermediate and final results back to main memory 130, 108 via the I/O bus 142.

Alternatively or in addition, the core processors 120 can access low-latency memory 118 directly using the LLM bus 158. For example, the core processors 120 can access low-latency memory 118 to initially store the graphs into the memory 118.

In some embodiments, the low-latency memory 118 is provided externally to the core processors 120. For example, the low-latency memory 118 can be provided in one or more physical devices (e.g., modules or chips) interconnected to the core processors 120. Regardless of their physical configuration, the separate memory devices 118 are preferably located close to the core processors (e.g., collocated together on the same motherboard).

Figure 6:
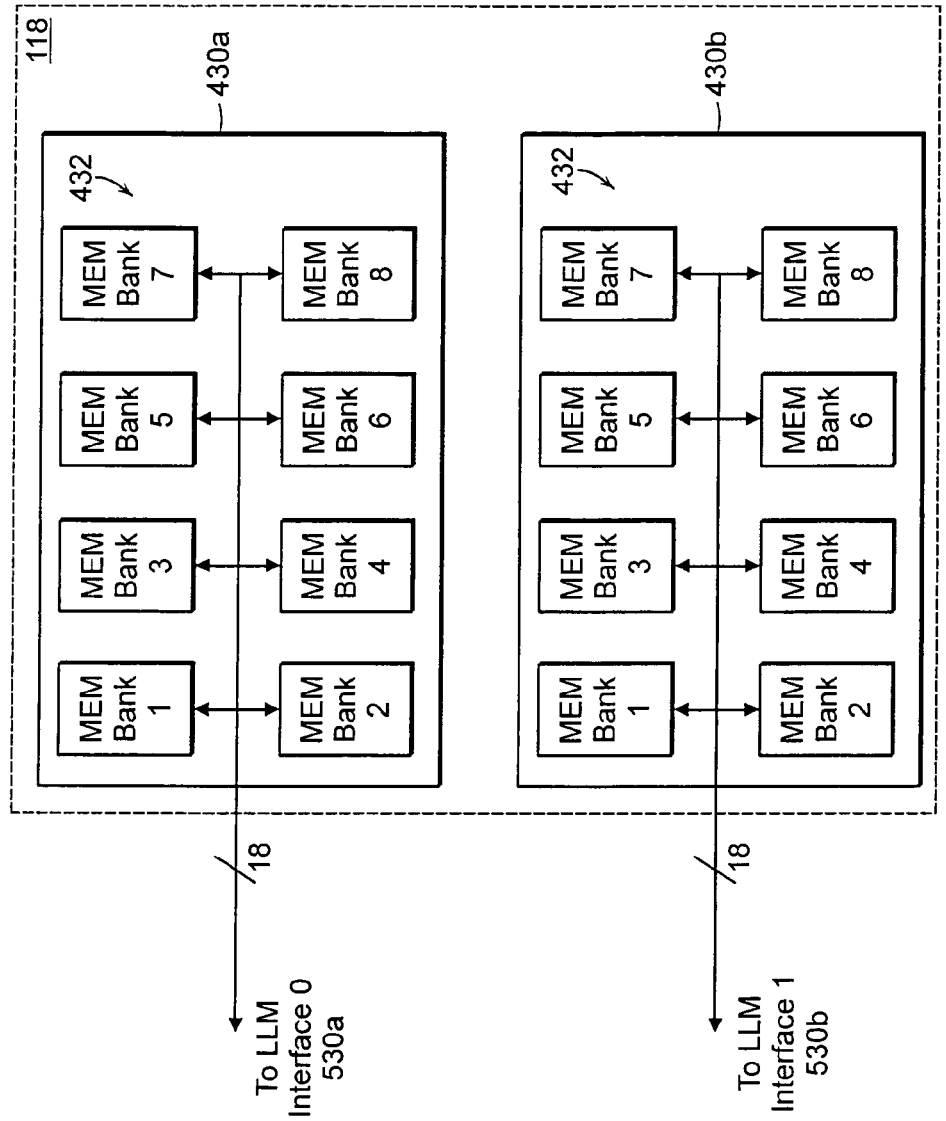
FIG. 6 is a block diagram of one embodiment of the low-latency memory of FIGS. 2 and 3.

An exemplary embodiment of the low-latency memory 118 is illustrated in FIG. 6. The memory 118 consists of two physical memory devices 430a, 430b (generally 430). Each of the memory devices 430 includes a number of memory banks. As shown, the devices 430 each include eight memory banks 432. The memory banks 432 are distinguishable, such that the LLM controller 160 can selectably write data to and read data from each of the multiple banks 432. Each of the memory devices 430 includes a respective interface 530a, 530b interconnected to a respective one of the LLM interfaces 425 of the DFA unit 400. Other embodiments can include more or less than two memory devices 430. Alternatively or in addition, each of the memory devices 430 can be configured having more or less than the eight memory banks 432 of the illustrative embodiment. Alternatively or in addition, each of the memory devices 430 can be coupled to the DFA unit 400 using more than one LLM interface 530.

Each of the LLM interfaces 425 of the DFA unit 400 is coupled to a respective interface 530 of the low-latency memory 118. The interfaces 425, 530 include multiple interconnecting leads that are generally arranged into different groups. For example, some of the leads are used to select a particular memory bank 432 (e.g., three leads being sufficient to select any one of up to eight banks of memory: $2^3=8$). Other of the interconnecting leads can be used to select or reference a particular memory address (e.g., 20 leads capable of selecting up to approximately 512K memory addresses and 21 leads capable of selecting up to approximately 1024K memory addresses). Additionally, still other leads can be used to provide the data being transferred between the low-latency memory and the DFA unit 400 (e.g., 32 leads capable of transferring up to 32 bits of data at a time). Still other leads can be used for timing information (e.g., providing a clock signal) and/or a command identification (e.g., selecting from one of a number of commands, such as a read command versus a write command).

The LLM controller 160 (FIG. 4) includes multiple Low-Latency Memory (LLM) queues, one queue associated with each of the low-latency memory banks. Each LLM queue has a respective queue status indicator indicating the number of low-level memory access requests stored in the respective queue. The DFA unit 400 also includes a thermometer unit and one or more configuration registers. Thus, each LLM queue can be used to access a DFA graph stored in one of the memory banks. In the illustrative example, the LLM controller 160 includes sixteen LLM queues, one queue for each of the sixteen memory banks 432.

The instruction unit 410 can include a doorbell register 420 for storing a value indicative of the cumulative number of outstanding DFA instructions that software has previously written to the DFA instruction first-in-first-out (FIFO) buffer in main memory 130, 108. Other configuration registers can be provided to identify other aspects related to accessing and using low-latency memory 118.

The DFA unit 400 fetches queued instructions from the DFA instruction FIFO in main memory 130, 108 using the I/O bus 142. The DFA unit 400 then determines which of the DFA thread engines 405 the instruction will be joined with. The DFA thread engine 405 processes the DFA instruction, generates low-latency memory access requests. The DFA unit 400 includes circuitry adapted to determine which of the low-latency memory banks is most likely to serve the memory-access request with the least delay. To do this, the DFA unit 400 joins the memory-access request to the LLM queue having the least queued entries. Queued entries in each of the LLM queues are then processed by the LLM controller 160 using DFA load/store commands.

A thermometer unit can be used to identify which of a number of available LLM queues has the least queued entries. To accomplish this, the thermometer unit first determines which LLM queues to inspect according to which memory banks store replications of the requested DFA graph. Next, the thermometer unit compares the number of entries queued in each of the multiple LLM queues. The thermometer unit then compares the number of queued entries among each of the available LLM queues, determining which LLM queue has the least number of queued entries. The thermometer unit then provides an indication of the LLM queue having the least number of queued entries to the LLM controller 160. The LLM controller 160, in turn, processes the queued entries, such as a memory access request, using the LLM queue with the least number of queued entries as identified by the thermometer unit.

The number of instructions stored in a queue can be determined using a queue status indicator. For example, the queue status indicator can simply be a pointer pointing to the next available instruction location within the respective queue. Knowing an end-point of the queue, simple pointer arithmetic is used to calculate the number of queued instructions.

Alternatively or in addition, the queue status indicator can store a counter value indicative of the number of queued instructions. Thus, when an instruction is written into a queue, the counter value of the queue status indicator is incremented. Similarly, when an instruction is read from the queue, the counter value of the queue status indicator is decremented. In some embodiments, when more than one of the queues have the same lowest number of queued instructions, an algorithm can be used to identify which queue to use. For example, the queue having either the highest or the lowest reference designation will be selected. Alternatively, the queue can be selected randomly from the number of available queues.

In the exemplary embodiment, the LLM controller 160 of the DFA unit 400 can control up to eight memory banks 432 on each of the two LLM interfaces 435a, 435b. Table 1 indicates primary performance characteristics of individual 36-bit LLM references using eight-bank memory devices 430. The table also indicates which interface is used and which bank 432 within the memory device 430 is used. Entries in the interface column indicate the number of 18-bit interfaces that are used.

TABLE 1

Performance Characteristics of Individual 36-bit LLM References

| Interfaces | Replication | Offset<3:2> | Uses Interface | Uses Bank |
|---|---|---|---|---|
| 2 | None | xx | =Offset<2> | =Offset<5:3> |
| 2 | 2x | xx | 0 + 1 | =Offset<4:2> |
| 2 | 4x | 00 | 0 + 1 | 0 + 1 |
| 2 | 4x | 01 | 0 + 1 | 2 + 3 |
| 2 | 4x | 10 | 0 + 1 | 4 + 5 |
| 2 | 4x | 11 | 0 + 1 | 6 + 7 |
| 2 | 8x | x0 | 0 + 1 | 0 + 1 + 2 + 3 |
| 2 | 8x | x1 | 0 + 1 | 4 + 5 + 6 + 7 |
| 1 | None | xx | 0/1 | =Offset<4:2> |
| 1 | 2x | 00 | 0/1 | 0 + 1 |
| 1 | 2x | 01 | 0/1 | 2 + 3 |
| 1 | 2x | 10 | 0/1 | 4 + 5 |
| 1 | 2x | 11 | 0/1 | 6 + 7 |
| 1 | 4x | x0 | 0/1 | 0 + 1 + 2 + 3 |
| 1 | 4x | x1 | 0/1 | 4 + 5 + 6 + 7 |
| 1 | 8x | xx | 0/1 | 0 + 1 + 2 + 3 + 4 + 5 + 6 + 7 |

In the exemplary configuration having two LLM interfaces 425 with no replication selected, the particular interface used is determined by a first value. For example, the first value can be one or more bits in an offset field provided within an instruction. The value Offset<2> and the memory bank referenced is determined by a second value, such as the value of other bits within the same offset field (e.g., Offset <5:3>). Thus, a value of Offset<2>=1, uses LLM interface_1 425b. The particular memory bank 432 interconnected through the first LLM interface 425b is determined by the value of Offset <5:3> (i.e., Offset<5:3>="011" refers to memory bank 3).

Continuing with the exemplary configuration having two LLM interfaces 425 and with a replication factor of two (i.e., 2x), both interfaces are used. The particular memory bank referenced on each of the respective interfaces is determined by the value of Offset <4:2>. Thus, the particular one of the eight available memory banks 432 interconnected through the respective LLM interface 425 is determined by the value of Offset <4:2> (i.e., Offset<4:2>="111" refers to memory bank 8 on each of the two memory devices 430).

With a replication factor of four (i.e., 4x), both interfaces are used, with a selectable pair of memory banks 435 being used on each of the two memory devices 430. Thus, the values of Offset <3:2> determine which banks 425 are used, as identified in Table 1. Similarly, with a replication factor of eight (i.e., 8x), both interfaces are again used, with a selectable group of four memory banks 425 being used on each of the two memory devices 430 as indicated in Table 1.

Figure 7:
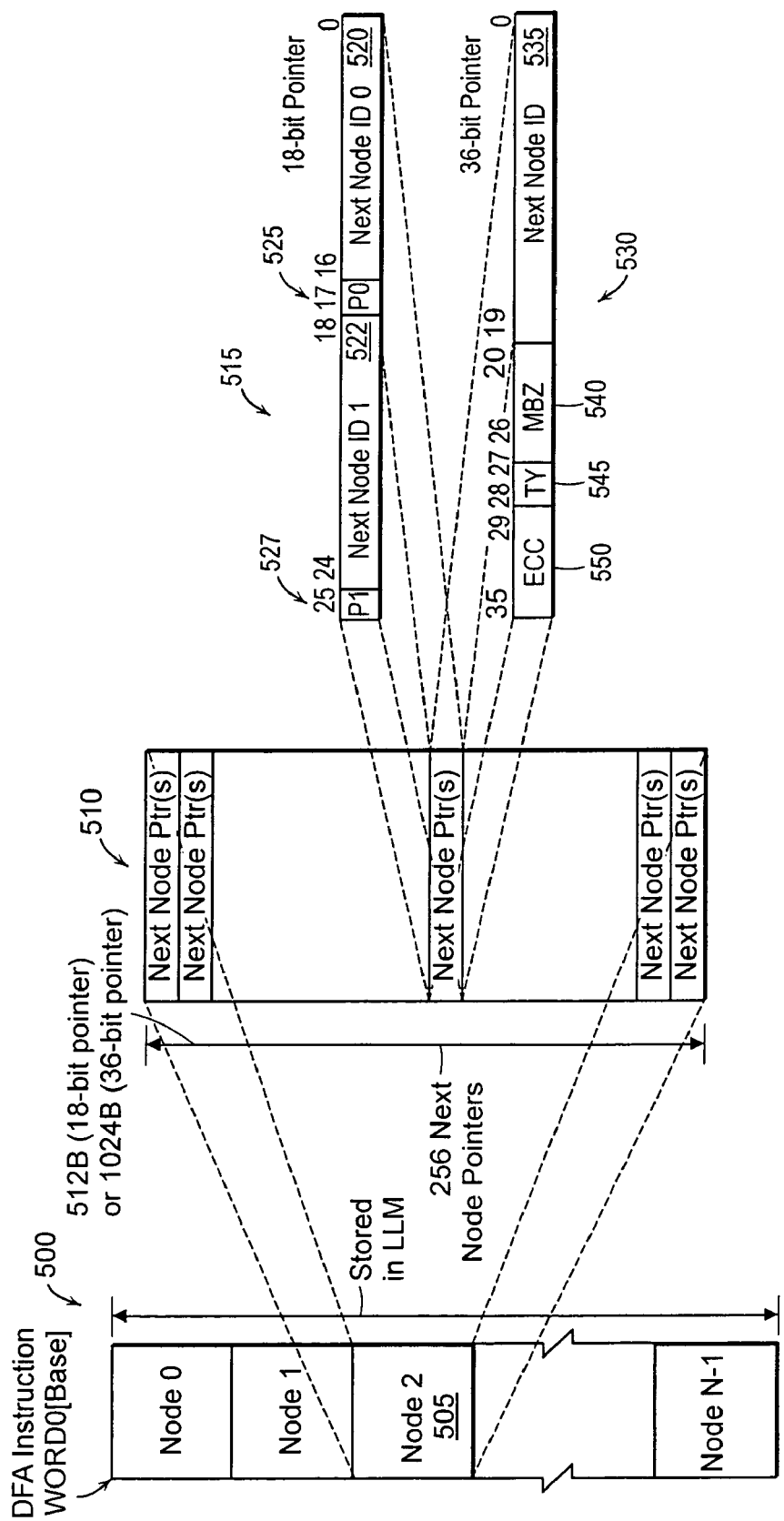
FIG. 7 illustrates an exemplary embodiment of a low-latency memory data structure used by the DFA thread engines of the DFA unit shown in FIG. 4 to traverse a graph.

FIG. 7 shows an exemplary DFA data structure 500 (i.e., graph) stored in low-latency memory 118. As described above, the DFA graph 500 can be referenced by a pointer to its first node (i.e., Node 0) and is traversed by the DFA thread engines 405. Generally, the graph 500 consists of N different nodes 505. Each node 505 in the graph 500 includes an array of next-node pointers 510, with one next-node pointer 510 being provided for each unique input byte value. Thus, for a DFA graph 500 having an 8-bit alphabet, there are $2^8$=256 next-node pointers 510. Each next-node pointer 510 contains a next-node identifier (ID) that directly specifies the next node/state for the input byte.

In some embodiments, the DFA unit 400 supports either an 18-bit next-node pointer format 515 or a 36-bit next-node pointer format 530. With an 18-bit pointer 515, each node 505 requires 18*256-bits, or approximately 512 bytes of storage in low-latency memory 118. With a 36-bit pointer 530, each node 505 requires 36*256-bits, or approximately 1 kilobyte of storage in low-latency memory 118. Replication of any of the stored data can increase the resulting overall storage requirements accordingly.

With an 18-bit pointer 515, each next-node pointer 510 includes a next-node identification field 520, such as the 17-bit next-node ID0. A corresponding parity bit 525 is also provided. In the exemplary embodiment using even parity, the parity bit is determined as the exclusive-OR (XOR) of all 17 bits of the Next Node ID 520). A 36-bit word can thus store two 18-bit pointers 520, 522, each having a respective parity bit 525, 527, respectively.

With a 36-bit pointer 530, each Next Node Pointer 510 includes a 20-bit Next Node ID field 535, a two-bit type value field 545, a seven-bit Error Correction Code (ECC) field 550, and seven unused bits 540. Preferably, the unused bits are set to zero. The DFA thread engine 405 uses the ECC code 550 in the 36-bit pointer 530 to automatically repair single bit errors, and to detect double bit errors. The type value 545 indicates the next-node type and, for example, can hold the following values:

0=Normal
1=Marked
2=Terminal

To use the DFA thread engines 405, system software first pre-loads the low-latency memory 118 with a DFA graph 500, such as the one shown in FIG. 7. System software also provides the DFA unit 400 with a pointer to the start of the graph, the starting node ID, and the particular input bytes. A pseudo-code listing is provided in Table 2 describing functions performs by an exemplary DFA thread engines 405 during the course of processing each byte.

TABLE 2

DFA Thread Engine Processing

```
//ptr_size is 2 for 18b, 4 for 36-bit
DTE_Byte(graph_ptr, node_id, byte, ptr_size, IWORD3[TSize],
IWORD3[Msize]) {
  enum { NORMAL, PERR, TERM, MARKED }
  condition = NORMAL;
  node_ptr = graph_ptr + node_id*256*ptr_size
  next_node_ptr_ptr = node_ptr + ((byte*ptr_size)>>2)*4
  next_node_ptr = LLM_LOAD(next_node_ptr_ptr)
  if(ptr_size == 2) { // 18-bit pointer
    next_node_ptr = next_node_ptr >> (byte<0>*18)
    next_node_id = next_node_ptr<16:0>
    if(parity_error)
      condition = PERR
    else if(next_node_id >= (128*1024 – IWORD3[TSize]*256))
      condition = TERM
    else if(next_node_id < IWORD3[Msize])
      condition = MARKED
  }
  else {              // 36-bit pointer
    next_node_ptr = SECDED(next_node_ptr)
    next_node_id = next_node_ptr<19:0>
    if(double-bit ECC error)
      condition = PERR
    else if(next_node_ptr <28:27> == 2)
      condition = TERM
    else if(next_node_ptr <28:27> == 1)
      condition = MARKED
  }
  return(condition, next_node_id);
}
```

In some embodiments, the DFA thread engines 405 can support special node pointer conditions. For example, the DFA thread engines 405 can support up to three special node pointer conditions identified in Table 3.

TABLE 3

Special Node Pointer Conditions

| Condition | Description |
|---|---|
| PERR | Error condition indicating that the next node pointer 510 encountered an error. The DFA Thread Engine 405 creates a result word indicating the failing low-latency memory location. The DFA Thread Engine 405 terminates traversal of the graph 500. |
| TERM | Terminal condition indicating that the next node 505 is a terminal node, further indicating that the traversal of the graph 500 should stop. The DFA Thread Engine 405 creates a result word indicating the byte that traversed to the terminal node, the prior Node ID, and the next node ID. The DFA thread engine 405 terminates traversal of the graph 500. |
| MARKED | Marked condition indicating that the instant transition should be marked for later analysis by core software. The DFA thread engine 405 creates a result word indicating the byte that traversed to the marked node, the prior node ID, and the next node ID. The DFA thread engine 405 continues traversal of the graph 500. |

In 18-bit mode, the DFA thread engine 405 determines the special TERM and MARKED conditions by comparing the values of the next-node ID fields 520, 522. In this case, all transitions entering a marked node 505 are marked. In 36-bit mode, the DFA thread engine 405 determines the special TERM and MARKED conditions directly from the type field 545 in the next-node pointer 530. In fact, individual transitions, not just individual nodes, can be marked in 36-bit mode. Continuing with the example of FIG. 5B, using an 18-bit pointer, Nodes 4 and 5 are marked. Thus, traversal of either node is indicative of an occurrence of the respective Search String within the input string and identified for later analysis. Alternatively, using a 36-bit pointer, the arcs from Node 3 to Nodes 4 and 5 are marked. Thus, by using the DFA marking technique in combination with the DFA thread engines, the presence and location of multiple, different strings can be found within the same input string, in a single pass through the input string.

Figure 11:
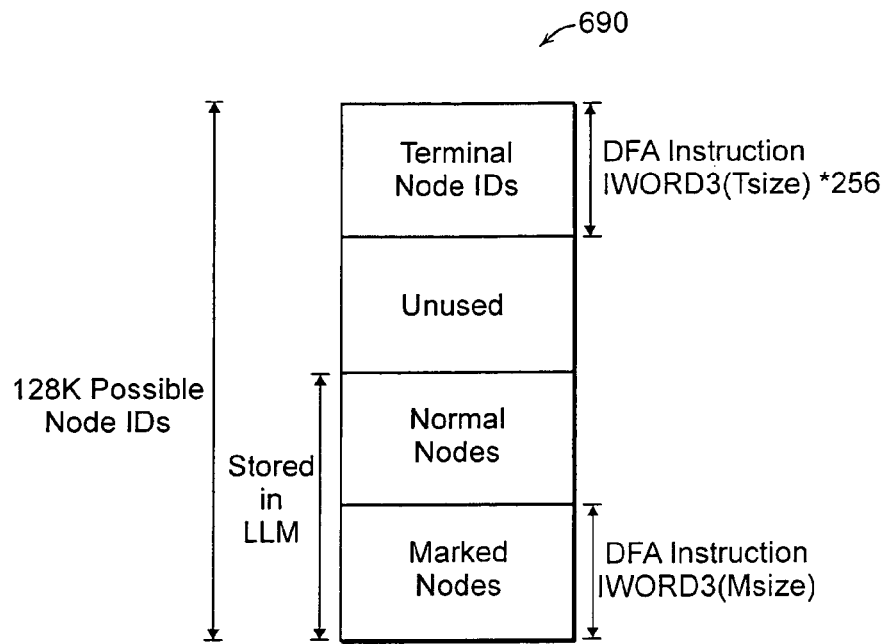
FIG. 11 illustrates all possible 17-bit Node IDs of an exemplary classification of Node IDs in 18-bit mode.

FIG. 11 graphically illustrates the possible 17-bit node IDs 690 as well as identifying how they are classified in 18-bit mode. DFA instructions, described in more detail below, contain parameters that specify the number of terminal and marked nodes (e.g., the IWORD3[TSize] parameter of Table 2 specifies the number of terminal nodes and the IWORD3 [Msize] parameter, also of Table 2, specifies the number of marked nodes). The number of terminal node IDs, IWORD3 [TSize], are the largest ones and need not be backed by actual storage in low-latency memory 118. Only normal and marked nodes are backed by actual low-latency memory storage.

As the DFA thread engines 405 traverse the graphs 500 stored in low-latency memory 118, they produce result words as exceptional conditions arise. Next-node pointers, such as MARKED, TERM or PERR, represent such exceptional conditions. Two additional exceptional conditions include: completions of input data (DATA_GONE) and exhaustion of result space (FULL). Though traversal of a graph 500 for an input byte may result in multiple exceptional conditions, a single input byte can produce, at most, one result word (RWORD1+). For example, the last input byte will encounter a DATA_GONE condition and so will produce an "RWORD1+" result word. The last input byte may also encounter a marked next node, but a second RWORD1+ result is not created. Traversal of the graph 500 stops when a (priority-ordered) PERR, TERM, DATA_GONE, or FULL exception condition occurs and the DFA thread engine 405 reports the highest priority condition.

Each DFA instruction can specify whether direct or gather mode should be used to construct the data to be processed by the DFA thread engine 405. In either case, the DFA unit 400 reads the bytes from main memory 130, 108.

FIG. 8 depicts an exemplary structure of a DFA instruction queue 600 stored in main memory 130, 108. The DFA instruction queue 600 includes one or more DFA instructions 610a-610e (generally 610). The DFA instruction queue 600 is configured by software allocating the chunks or buffers 605 for storing DFA instructions. At boot time, a queue is established by writing a starting tail pointer. The allocation is ongoing, as packets are received. The DFA unit 400 frees the chunks 605 after the instructions have been processed by the DFA thread engine 405. The DFA unit 400 includes a tail pointer 620 that contains the address of the tail—the last DFA instruction stored in the DFA instruction queue 600.

The instruction queue 600 is a linked-list of "chunks," or buffers 605a, 605b, 605c (generally 605). For DFA instruction queues 600 having more than one chunk 605, the different chunks 605 are linked by a next-chunk buffer pointer 615a, 615b (generally 615). For the illustrated DFA instruction queue 600, the first chunk 605a includes a next-chunk buffer pointer 615a that points to the first DFA instruction 610b stored in the second chunk 605b. The second chunk 605b, in turn, includes a number of DFA instructions 610 followed by a next-chunk buffer pointer 615b that points to the first DFA instruction 610e of the third chunk 605c. The third chunk 605c is the last, so a next-chunk buffer pointer 615 is not required. As illustrated, a software head pointer 625 points to the next empty buffer location immediately after the last stored instruction 610e.

In operation, the DFA unit 400 reads words from the DFA instruction queue 600 (starting at the tail), and traverses the next chunk buffer pointer 615a to the next chunk 605b when it reaches the last instruction 610a of a chunk 605a. When the DFA unit 400 "jumps" chunks 605 in this manner, it frees the earlier chunk/buffer 605a to a hardware-managed pool.

A configuration value stored in the configuration register 450 can be used to indicate the size of a chunk 605 to be used in buffering DFA instructions. FIG. 8 shows an example for a chunk size of three DFA instructions 610—a minimum legal value. Generally, the DFA instructions 610 are fixed size (e.g., 32 bytes). The 64-bit word that immediately follows the DFA instructions 610 in a chunk 605 is a next-chunk buffer pointer 615. This example shows five DFA instructions 610 in the instruction queue 600. The instructions 610, or commands, are numbered consecutively from zero to four, with the smaller numbers representing older (i.e., earlier stored) DFA instructions 610, the lowest number being stored at the tail of the queue. According to a FIFO configuration, older instructions are started first on a DFA thread engine 405. Preferably, each DFA instruction 610 resides entirely within one chunk, not straddling a chunk boundary.

The DFA unit 400 maintains a tail pointer 620 pointing to the address of the DFA instruction 610a at the tail of the queue 600. Software (e.g., system software) maintains a head pointer 630 pointing to the most-recently-stored DFA instruction 610e at the head of the queue. To insert a packet into a queue 600, software must first write the DFA instruction 610 into the queue 600, allocating chunks 605 if necessary. A doorbell register 420 (FIG. 4) stores a count of the number of DFA instructions stored in the queue.

The distance between the head pointer 630 and the tail pointer 806 is both the size of the DFA instruction queue 600 and the outstanding doorbell count. The size of the DFA instruction queue 600 is only limited by the available memory and the number of bits in the doorbell counter 420 for the DFA instruction queue 600. For example, in an embodiment with a 20-bit doorbell counter, the queue is limited to $2^{20}$ words.

Note that the DFA unit 400 may read the next chunk buffer pointer 615 as soon as the doorbell count indicates that the last DFA instruction 610 in a chunk 605 contains a valid DFA instruction 610. This implies that software must allocate a next chunk buffer 605, and set the next chunk buffer pointer 615 in the prior chunk 605 to point to it, as soon as it writes the last DFA instruction 610a into the chunk 605a.

Doorbell writes are of DFA instruction granularity and software can "ring the doorbell" with any number of DFA instructions 610. Software can issue a doorbell write for each individual DFA instruction 610, or can accumulate multiple DFA instructions 610 into a single doorbell write. The only requirements are that the number of valid DFA instructions 610 in the queue 600 must be at least as large as the doorbell count, and the next-chunk buffer pointers 615 interspersed among the DFA instructions 610 must also be set up properly. At system initiation, or boot time, system software configures the DFA instruction queue 600 with an original next-chunk buffer pointer 615 (i.e., the starting tail pointer 620) with a write to a configuration register 450 established for storing this value.

FIG. 9 shows an exemplary next-chunk buffer pointer format 630. The primary component is the address (Addr) field 635 storing a value indicative of a valid byte location in main memory 130, 108. Though the Addr field 635 refers to a byte address, it is preferably naturally aligned on a 128-byte cache block boundary. Accordingly, its least-significant 7 bits will be zero.

Each DFA instruction 610 has the information the DFA unit 400 needs to start a DFA thread engine 405, read input data, traverse the graph 500 in the low-latency memory 118, and write results. As shown in the exemplary DFA instruction format of FIG. 10, each DFA instruction 610 includes four independent words (i.e., four 64-bit words representing 32 bytes) 655, 660, 665, 670 within main memory 130, 108. The instruction 610 specifies to the DFA thread engine 405 scheduled to process the instruction both the input byte locations as well as the result location. The DFA unit 400 reads DFA instructions 610 and input data from main memory 130, 108 when the DFA instruction queue 600 has a valid DFA instruction 610, and writes the results as it creates them. The DFA unit 400 can also optionally submit a work queue entry after finishing, so the DFA instruction 610 can include a field for a work queue pointer.

For example, the first DFA instruction word 655 includes a base address identifying a DFA graph by the memory location of its first node. The first word 655 also provides additional information, such as a replication field storing a preselected replication and a type value indicative of the type of addressing used and a start node ID 656 identifying at which node of the graph processing will start. The second DFA instruction word 660 includes a length field 661 identifying the number of bytes to be processed by the DFA 405 and an address field 662 storing an address reference to the byte to be processed. The third DFA instruction word 665 includes a results address field 666 identifying an address (e.g., an address in main memory 130, 108) into which any results should be written, along with a maximum results field 667 storing a value indicative of the maximum number of results allowed. Still further, the fourth DFA instruction word 670 can include one or more fields related to work queue processing.

Figure 12:
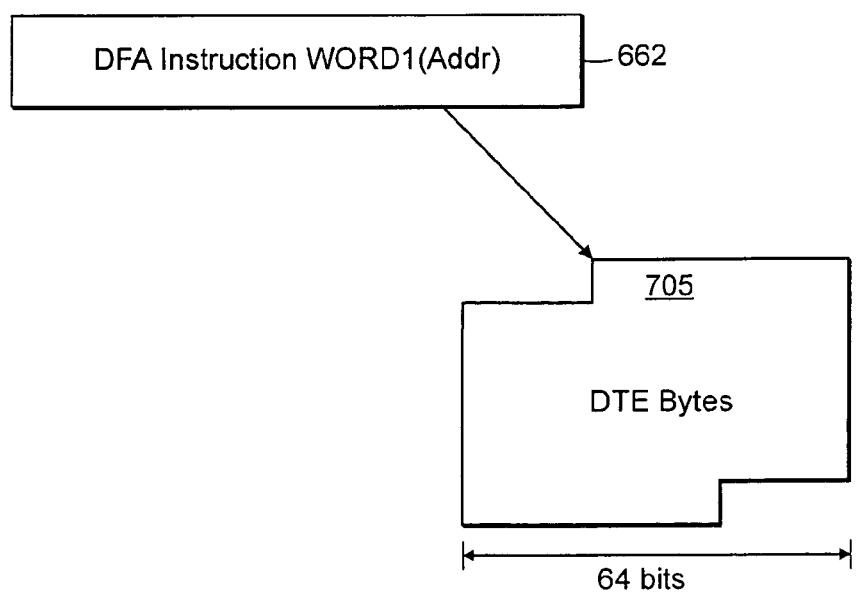
FIG. 12 illustrates an exemplary usage of a direct mode to construct the data to be processed by the DFA thread engine.

FIG. 12 shows an example of usage referred to as direct-mode for constructing the data to be processed by the DFA thread engine 405. The DFA instruction 610 directly specifies a starting location using the memory address provided in address field 662 of the DFA instruction 610 and the number of bytes to be processed using the length field 661. The DFA thread engine 405 processing the corresponding DFA instruction 610 reads the identified number of contiguous bytes 705 from main memory 130, 108 starting at the identified address, processing each byte in turn.

Figure 10:
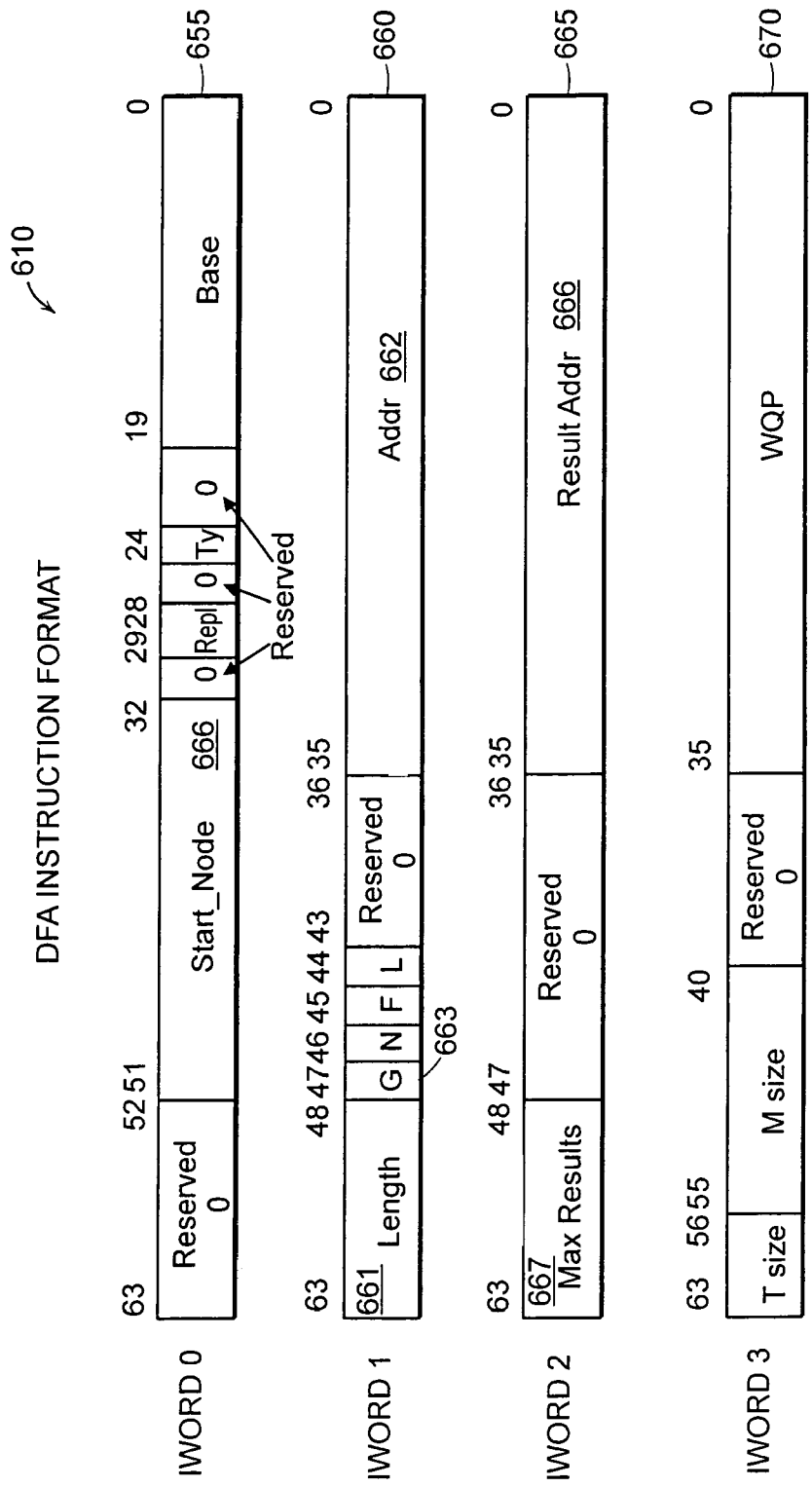
FIG. 10 shows an exemplary format of a DFA instruction.
Figure 13:
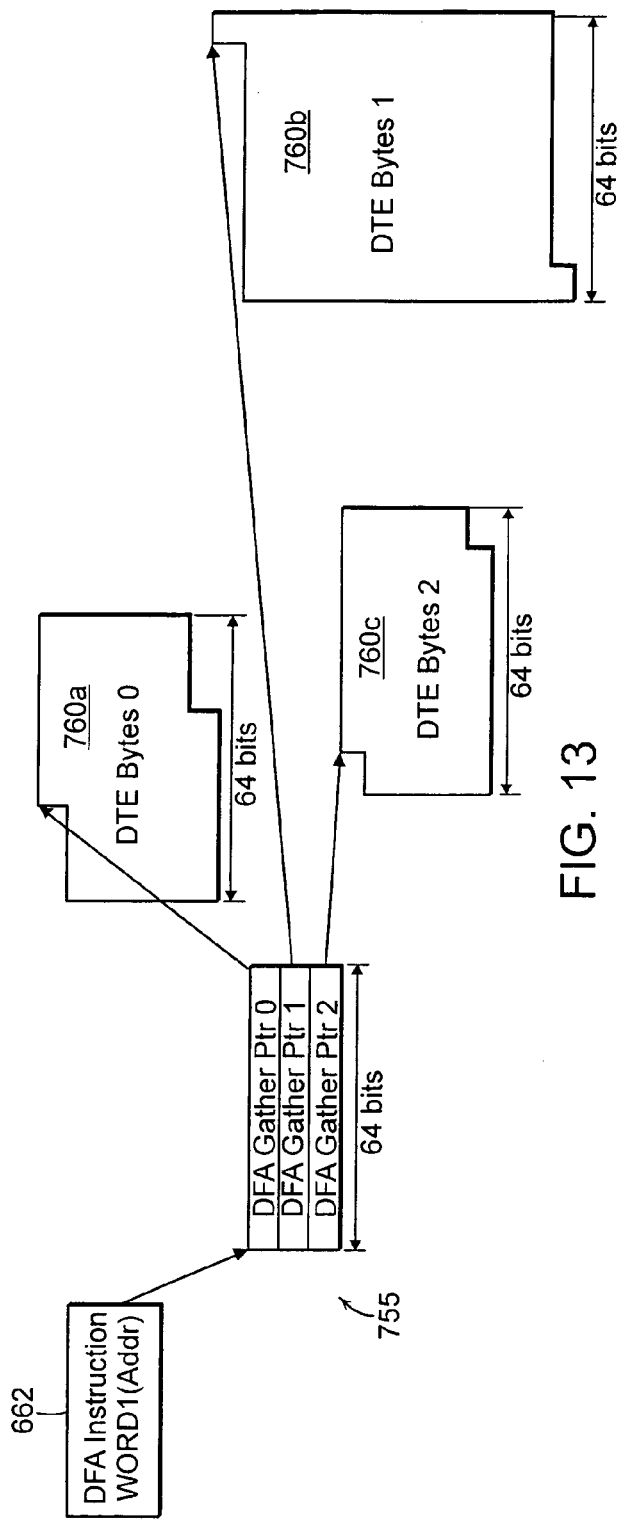
FIG. 13 shows an exemplary usage of the gather mode to construct the data to be processed by the DFA thread engine.

FIG. 13 shows an exemplary of usage of an alternative mode referred to as gather mode. Using gather mode, the data (i.e., input bytes) to be processed by the DFA thread engine 405 need not be stored contiguously within main memory 130, 108. Rather, the input bytes can be stored contiguously in two or more separate locations of main memory 130, 108. In gather mode, the DFA instruction 610 first identifies that it is a gather mode instruction, using a gather-mode identification field 663 (FIG. 10). In gather mode, the address field 662 of the DFA instruction 610 specifies the starting location of the first gather pointer and size of a DFA gather pointer list 755 also stored in main memory 130, 108. Each entry of the DFA gather pointer list 755 specifies the starting location and size (i.e., number of the bytes) of a respective one of the two or more separate memory locations for the DFA thread engine 405 to process. The total input byte stream for the DFA thread engine 405 is obtained by a concatenation of the stored bytes referred to by each entry identified in the gather list 755. Thus, in the example of FIG. 13, the input byte stream is the concatenation of a first contiguous storage segment (i.e., DTE Bytes_0) 760a, a second contiguous storage segment (i.e., DTE Bytes_1) 760b, and a third contiguous storage segment (i.e., DTE Bytes_2) 760c, each of the segments 760 being noncontiguous with the other segments 760. The DFA thread engine 405 processing the corresponding DFA instruction 610 reads the first entry of the gather list 755, which directs it to the first segment 760a. Once completed, the DFA thread engine 405 reads the second entry of the DFA gather list 755, which directs it to the second segment 760c, and so on until all of the input bytes are read.

Figure 14:
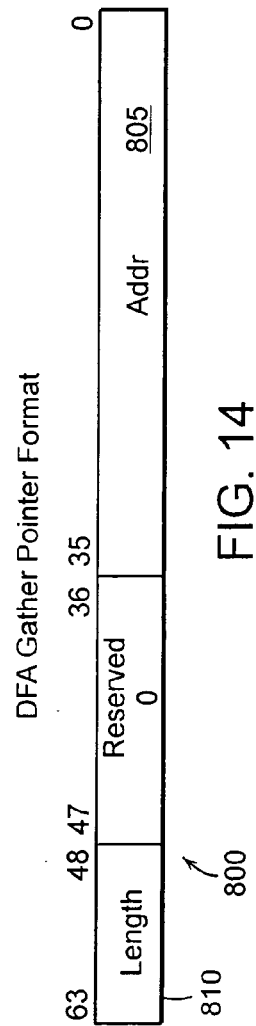
FIG. 14 illustrates in more detail the DFA gather pointer format shown in FIG. 13.

FIG. 14 illustrates an exemplary 64-bit DFA gather pointer format 800 representing each of the entries of the DFA gather pointer list 755. The 64-bit gather pointer 800 contains a length field 810 storing a value indicative of the number of input bytes stored within the respective contiguous segment 760. An address field 805 is also provided storing an address to the first byte of the respective contiguous segment 760. Once the last byte of the respective contiguous memory segment 760 is processed, the next DFA gather pointer is read from the list.

The DFA gather pointers 755 themselves should be naturally-aligned on a 64-bit boundary. It is not necessary for the bytes pointed to by the DFA gather pointer 755 within main memory 130, 108 to be naturally-aligned; they can have any arbitrary byte alignment. In the gather mode, the total number of input bytes is the sum of the respective length fields 810 in each of the DFA gather pointers 755.

Figure 15:
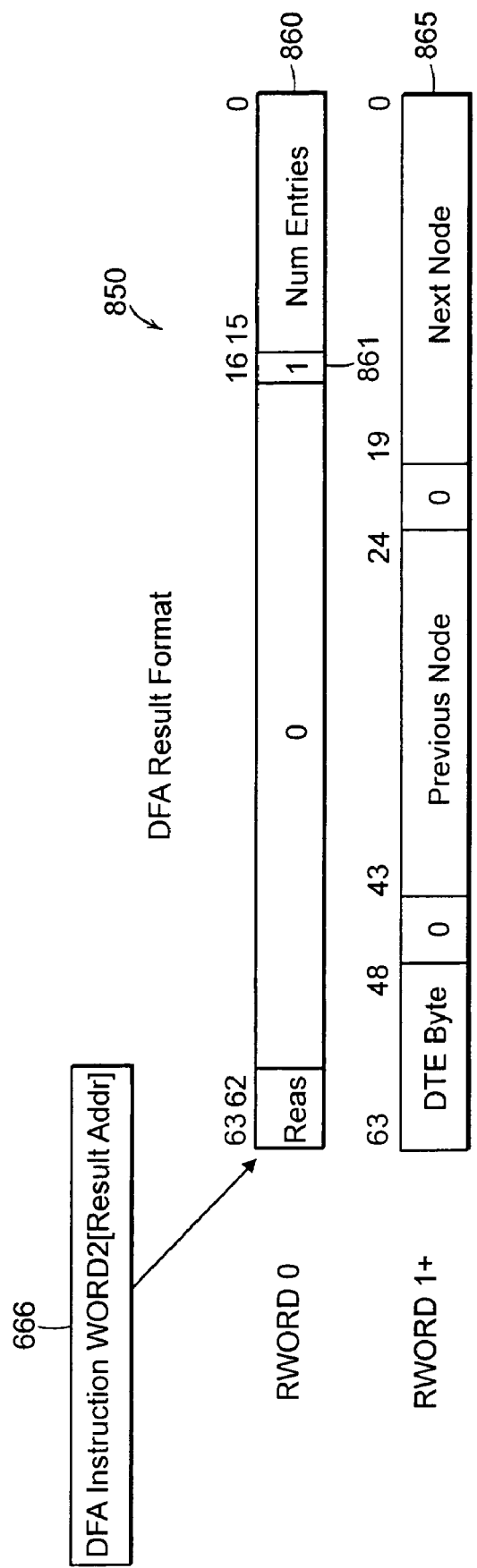
FIG. 15 illustrates an exemplary result format responsive to the DFA instruction shown in FIG. 10.

FIG. 15 shows an exemplary DFA result format 850 storing the result produced by the DFA thread engine 405 responsive to a DFA instruction 610. The DFA result format 850 accommodates results of varying size. For example, the DFA result 850 includes a first results word (i.e., "RWORD_0" 860) and one or more subsequent results words (i.e., "RWORD_1+" 865), the subsequent words 865 provided as needed to accommodate the result. The structure is variable in length to accommodate DFA instructions 610 that traverse a variable number of marked nodes 505, but the result length can be limited by an upper bound provided the DFA instruction field (e.g., in the exemplary embodiment, the upper bound is provided in IWORD2[Max Results]). The DFA unit 400 writes these results words 860, 865 to main memory 130, 108 during and after it processes a DFA instruction 610. The DFA result 850 are written into main memory 130, 108 starting at the result address 666 provided in the DFA instruction 610. Each results word 860, 865 should be naturally aligned in main memory 130, 108.

Note that the first results word 860 of the DFA result 850 may be written more than once by the DFA unit 400. Only the last write into the first results word 860 contains the valid result. Though the DFA unit 400 may write the first results word 860 multiple times, only the last write can set a results-word-written bit 861. Namely, the results-word written bit 861 will not be set by the DFA unit 400 until it has written all other words of the result. By first writing the results-word-written bit 861 to zero before it submits the DFA instruction 610 to the DFA unit 400, system software can poll the results-word-written bit 861 to determine when the DFA unit 400 has completed the DFA instruction 610. When results-word-written bit 861 is set, the entire result is present.

FIG. 16 illustrates an exemplary format of a low-latency memory load/store instruction 870. These instructions 870 may be issued responsive to a core request or a DFA thread engine request. The load/store instruction 870 is issued by the LLM controller 160 to reference the low-latency memory 118 in response to a DFA instruction generated by a processor cores 120. These low-latency memory load/store instructions 870 differ from ordinary load store instructions provided in a typical general purpose instruction set in that they initiate loads/stores directly between a core processor 120 and the low-latency memory 118 (FIG. 3). The directness of this type of access is different from load/store instructions that either load or store data, as the case may be, between the main register file 328 (FIG. 3) of the core processor 120 and the cache-coherent memory system, which includes Level-1 data cache 154, Level-2 cache memory 130, and DRAM 108 (FIG. 4). In the exemplary embodiment, these load/store instructions 870 can be either 64-bit or 36-bit instructions. Performance is enhanced by allowing the processor cores 120 to have direct access to the low-latency memory 118 using the low-latency memory bus 158. These low-latency memory instructions allow data to be retrieved/stored in low-latency memory 118 faster than would otherwise be possible through the cache coherent memory system 154, 130, 108. By accessing low-latency memory 118 in this manner, performance of applications that do not require caching, such as regular expression matching can be dramatically improved. Exemplary low-latency memory load/store instructions include: a "DMTC2" instruction (causing a double move to co-processor 2) and a "DMFC2" instruction (causing a double move from co-processor 2).

As shown in FIG. 16, an exemplary format of a low-latency memory load/store instruction 870 includes: an instruction-type field 875, an instruction identification field 880, a main-register identification field 885, and an "impl" field 890. The instruction-type field 875 stores a value indicative of the type of instruction. For example, a value stored in the instruction-type field 875 can indicate that the instruction is a co-processor instruction, as opposed to a general purpose instruction. The instruction identification field 880 stores a value indicative of the particular instruction type (e.g., "move to" or "move from"). For example, a move-to instruction indicates that data is being moved from low-latency memory 118 to one of the core processor holding registers 330a, 330b (FIG. 3). Alternatively, a move-from instruction indicates that data is being moved from one of the holding registers 330a, 330b to a register in the main register file 328 (FIG. 3). Accordingly, in this embodiment each move-to/move-from instruction allows data to be moved one word at a time (e.g., 36 bits at a time for memory using a 36-bit word size). The main-register-identification field 885 stores a value indicative of a particular register to be accessed within the processor core's main register file 328. The "impl" field 890, in conjunction with the operation code, stores a value indicative of the type of coprocessor move instruction and the particular holding register 330a, 330b.

To load the contents of a holding register 330 to a register in the main register file 328 (i.e., DMF), the content of the main-register identification field 885 identifies the register in the register file 328 to which the data stored in the holding register 330 is stored. For example:

$$GPR[rt] = LLM\_DATA0<63:0> \qquad (1)$$

In this example, LMM_DATA0 represents a particular holding register 330a; whereas, GPR refers to the General Purpose Register of the main register file 328.

For a write (i.e., move-to) instruction, the main-register-identification field 885 identifies the register within the register file 328 storing the address of the location in low-latency memory 118. For example:

$$LLM\_DATA0<63:0> = 11memory[rt] \qquad (2)$$

In this example, LLM_DATA0 is holding register 330a; and llmemory refers to the low-latency memory 118.

As a further example, the following low-latency memory load instruction (DMTC2) can be used to load the holding register 330a with contents of a low-latency memory location instruction, such as:

$$DMTC2, \$5, 0x0400 \qquad (3)$$

In this example: (i) the instruction-type field 875 contains the value "DMT" representing that the instruction is a move-to instruction that will load a holding register 425 with data from low-latency memory 118; (ii) the instruction identification field 880 contains the value "C2" indicating that it is a coprocessor instruction; (iii) the main-register identification field 885 contains the value "$5" indicating that Register number 5 in the main register file 328 holds the address for the location in low-latency memory 118; and (iv) an impl value field 890 contains the value "0x0400" identifying the particular holding register 330. (This value is constant and can be a different value in another embodiment).

Similarly, a low-latency memory store instruction can be used to move data from the holding register 330 into the main register file 328. For example, the following low-latency memory store instruction can be used:

$$DMFC2, \$6, 0x0402 \qquad (4)$$

In this example: (i) the instruction-type field 875 contains the value "DMF" representing a move-from type instruction indicating that the controller 160 will store contents of the holding register 330 into the identified register in the main register file 328; (ii) the instruction identification field 880 contains the value "C2" indicating that it also is a coprocessor instruction; (iii) the main-register identification field 885 contains the value "$6" indicating that Register number 6 in the main register file 328 is the destination register; and an impl value 890 of "0x0402" identifying the particular holding register 330. (Again, this value is constant and can be a different value in another embodiment).

The instruction format shown above is by way of example and it should be understood by one skilled in the art the instruction format can be any format which allows non-ordinary loads/store instructions.

FIG. 17 illustrates an exemplary low-latency memory address format 900 used to reference low-latency memory DRAM words. For example, the low-latency memory address format 900 can be used for the "graph_ptr" referred to in Table 2. The low-latency memory address format 900 includes at least an offset field 905 and a replication field 910. The offset field 905 stores a value indicative of an address in the low-latency memory. The replication field 910 defines a replication value indicative of a replication factor. In an exemplary embodiment, the low-latency memory address format 900 includes 64 bits (bits 0 through 63). The offset field 905 can be defined by bits 0 through 29 and the replication field 910 can be defined by bits 32 through 34. The remaining fields of the address format 900 can be reserved for other purposes.

By way of example, a replication value of zero (i.e., replication field=00) indicates that there is no replication. No replication means that a single occurrence of each word is stored within the low-latency memory 118. This is also reflective of a replication factor of '1' (i.e., the word appears once within the low-latency memory 118). Continuing with this example, a replication value of one (i.e., replication field='01') indicates that there is replication and that each word within low-latency memory 118 will be accompanied by a single copy of that word. This is also reflective of a replication factor of '2' (i.e., the word appears twice within the low-latency memory 118). Similarly, replication values of two and three (i.e., replication field='10' and '11,' respectively) indicate that there is replication and that each word within low-latency memory 118 will be accompanied by three and seven copies of that word, respectively. These values are also reflective of replication factors of '4' and '8' (i.e., the word appears four times and eight times, respectively, within the memory 118).

The value stored in the Offset field 905 is typically a "byte" address pointing to a memory word. For example, an Offset<29:2> is the byte address identifying a 36-bit memory word. The notation Offset<29:2> signifies the value of the bits contained within bits 2 through 29 of the Offset field 905 of the memory address 900. In some embodiments, the minimum granularity of the low-latency memory controller 160 is a 36-bit word. Thus, sequential 36-bit words will differ by four bytes. This translates to a difference of four in the Offset field 905 (i.e., a difference of 4 in the byte address indicates a difference of 4 bytes stored in-memory). Preferably, the memory address references are "naturally aligned." Natural alignment can be obtained by setting the two least significant bits of the offset field 905 to zero (i.e., Offset<1:0>=00).

When the replication value 910 is set to zero, offset interpretation is Straightforward—consecutive offset values reference consecutive low-latency memory locations. However, when the replication value is non-zero, the offset interpretation is different. Low-latency memory locations consumed to store a single word for different replication values using the exemplary memory address format 900 is provided in Table 4.

TABLE 4

Low-Latency Memory DRAM Offset Locations

| Repl | Unreplicated (i.e., Repl = 0) Offsets Consumed |
|---|---|
| 0 | Offset<29:0> |
| 1 | (Offset<28:0>*2) + {0, 4} |
| 2 | (Offset<27:0>*4) + {0, 4, 8, 12} |
| 3 | (Offset<26:0>*8) + {0, 4, 8, 12, 16, 20, 24, 28} |

An address structure ensures that replicated copies of a word are stored in contiguous memory locations. For example; when the DFA unit 400 processes a store (e.g., storing a 36-bit word) having:

(i) an associated replication value of two (a replication factor of four); and (ii) an Offset<29:0> value=12, the controller 160 stores one copy of the 36-bit data word into the low-latency memory 118 at each of the following Offsets: 48, 52, 56, and 60. Referring to the third row of Table 4 according to the exemplary replication value of 2, an interim value is first determined by multiplying the Offset value (i.e., 12) by the prescribed factor 4 (i.e., Offset<27:0>*4). An interim value of 48 is obtained. The low-latency memory offsets are then determined by adding, in turn, the prescribed values of 0, 4, 8, and 12 to the interim value of 48, thereby resulting in the offsets of 48, 52, 56, and 60. The resulting offset addresses differ by a value of 4 meaning that they refer to adjacent 4-byte memory words.

Continuing with the 4-byte example, the next Offset<29:0> value would be 12+4=16. Again, for a replication value of 2, the resulting offsets according to Table 4, would be 64, 68, 72, 76. Again, the replications are contiguous, and they are also contiguous with the replications of the previous offset value (i.e., 12).

Thus, using this addressing structure, sequential 36-bit words will always differ by four in the Offset field 905, even when the words are replicated. This can make low-latency memory DRAM addressing very similar for software, independent of the replication factor. This presumes that words are not used with different replication values simultaneously.

In some embodiments, each of the core processors 120 references the low-latency memory 118 using special instructions, such as the DMTC2 and DMFC2 instructions described above in reference to FIG. 16. These instructions initiate either 64-bit or 36-bit loads/stores. Again, the addresses should be naturally aligned to ensure proper operation. Thus, the first two least-significant bits of the offset field 905 (i.e., Offset<1:0>) should be zero for a 36-bit load/store. Similarly, the first three least-significant bits of the offset field 905 (i.e., Offset<2:0>) should be zero for a 64-bit load/store. The same concept can be applied to ensure natural alignment for different word sizes (e.g., the first four bits=0 for a 128-bit load/store, etc.).

Figure 18A:
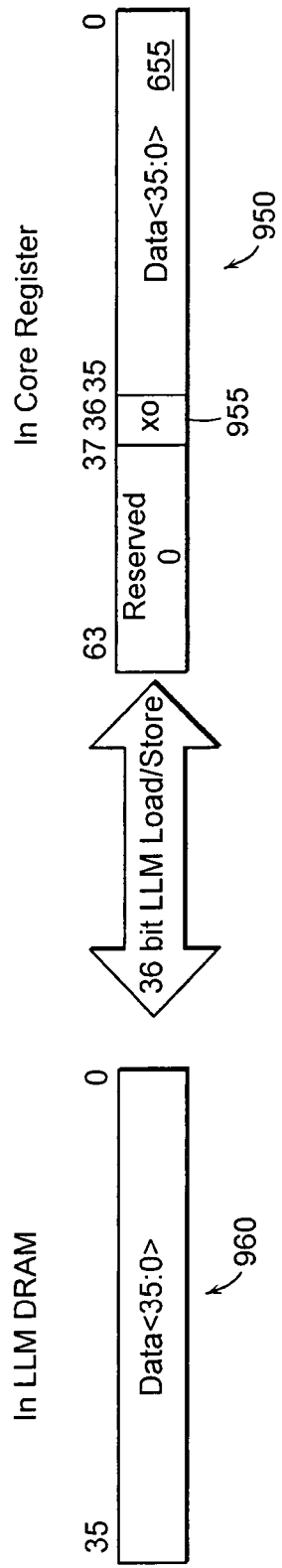
FIGS. 18A and 18B illustrate exemplary low-latency memory DRAM and core register formats for the 36-bit and 64-bit loads/stores, respectively, according to the principles of the present invention.
Figure 18B:
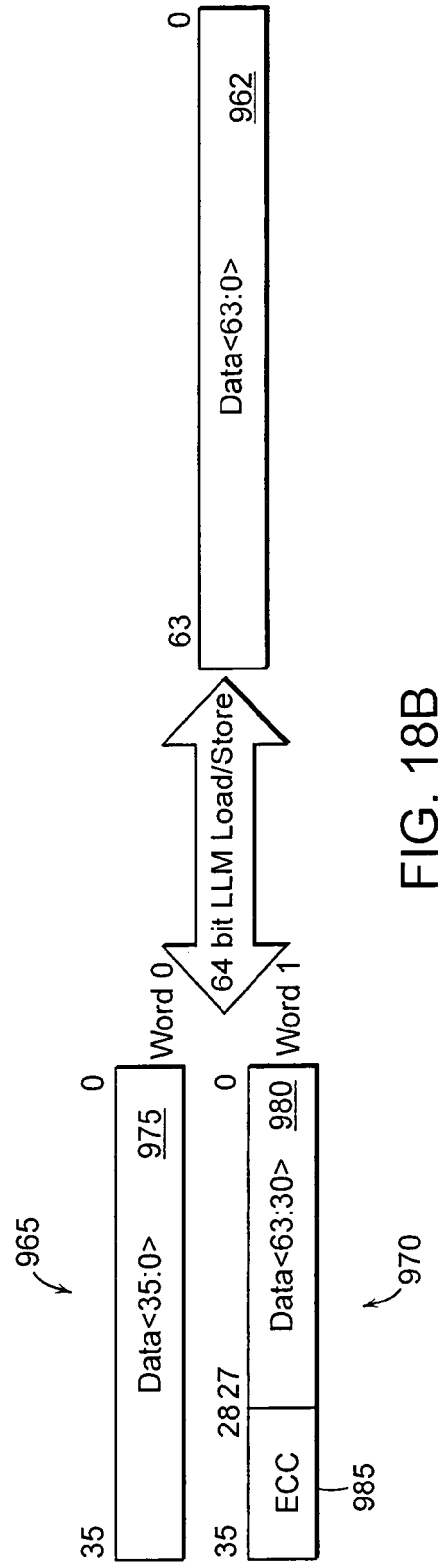

FIGS. 18A and 18B illustrates exemplary low-latency memory 118 and core-processor register formats for the 36-bit and 64-bit loads/stores, respectively. The illustration is representative of transfers in which the stored word is not replicated—a single low-latency memory word 960 corresponds to the core register 950. For transfers in which the stored word is replicated, there would be a corresponding number of copies of each word (e.g., two, four, or eight copies) in low-latency memory 118. The copies would be represented by additional low-latency memory word 960, one memory word 960 for each of the replicated copies.

As shown in FIG. 18A, 36-bit loads/stores reference a single 36-bit stored word 960. For a store, the hardware of the DFA unit 400 directly writes the lower 36 data-bits of the source register representing a Data field 655 (i.e., Data<35:0>) into the stored 36-bit memory word 960. The core register 950 also includes a parity field 955, shown as a single bit, referred to as the "XO" bit. Generally, the XO bit 955 is configured to store the exclusive-OR value of the all 36 stored bits. For a store, the XO bit must be zero. For a load, the DFA hardware places the stored 36-bit word in the lower 36 bits of the destination register (i.e., Data<35:0>), and also sets the XO bit to the exclusive-or of all 36 stored bits. In some embodiments, the DFA unit 400 does not directly support parity, or any other error checking or correcting code, for the 36-bit loads/stores. Thus, software must be relied upon to provide any error detection and/or correction. For example, software can implement parity or Error Correction Code (ECC), if desired, using some of the available, raw 36 bits. The XO bit 955 can also be used in conjunction with any software error detection and/or correction. When used, the XO bit 955 can accelerate software-based parity checks on a read operation, because it indicates that there is a parity error if software writes one of the 36 bits to the even-parity of the other 35 bits.

Referring now to FIG. 18B, the 64-bit low-latency memory DRAM load/store operations reference two consecutive 36-bit stored words 965, 970. Each of the stored words 965, 685 includes a respective data field. For example, a first 36-bit stored word 965 includes a single data field 975 (i.e., Data<35:0>). A second 36-bit stored word 970 also includes a single data field 980 (i.e., Data<36:36>). However, in some embodiments, the most-significant bits of the second stored word 970 can be used for error detection and/or correction.

For example, the most-significant bits can be referred to as ECC field 985 used for storing an 8-bit SECDED ECC code. Unlike the 36-bit load and store operations, the DFA unit 400 automatically generates an ECC code responsive to a 64-bit store, automatically checking and correcting the data on a 64-bit load. In some embodiments, each 36-bit word 965, 970 of the 64-bit word is replicated separately. Thus, the two stored words 965, 970 may not reside in consecutive (unreplicated) low-latency memory locations when the replication value is non-zero.

In some embodiments, replication is determined according to each stored data structure. Thus, a first data structure can have a replication factor of 2, whereas a second data structure can have a different replication factor of 4. Replication can be determined by system software at system initialization. Thus, system software initially populates the low-latency memory 118 with one or more data structures (e.g., DFA graphs), each data structure being replicated as required. Whether a particular data structure is replicated and what the associated replication is can be determined according to performance parameters. For example, if a particular data structure is accessed more frequently than others, that data structure can be replicated to a greater extent within low-latency memory 118. Similarly, if a particular data structure is accessed relatively infrequently, then that data structure can be replicated within low-latency memory 118 to a lesser extent, or perhaps not replicated at all. Additionally, replication of each stored data structure can be predetermined by a user.

When a data structure is replicated, all writes to that data structure will be written to all replicated data structures. Alternatively or in addition, reads from a stored, replicated data structure can be directed to any one of the independently stored versions of the replicated data structures. Thus, if a memory bank storing a requested data structure is busy serving an access request, the DFA thread engine 405 can direct the access request to one of the other memory banks containing a stored replicated value of the requested data structure according to the principles of the invention.

The cores 120 maintains a record of the stored data structures intended for later use. For example, system software accesses the record of stored data structures when generating a DFA instruction. Thus, the record includes at least a memory location of the stored data structure and a corresponding replication facture with which the data structure was originally stored. In some embodiments, system software maintains a look-up table in main memory for storing a list including a starting memory location for each previously-stored data structure and associated replication factor. This list can be generated when the data structures (e.g., DFA graphs) are originally created, or compiled and stored within the low-latency memory 118. As described above, DFA instructions identify a particular DFA graph and any available replications.

In an illustrative example, system software running on the cores 120 writes one or more DFA instructions into the DFA instruction queue located in main memory 130, 108. The doorbell register 420 is updated maintaining an accurate count of DFA instructions remaining within the DFA instruction queue. The DFA unit 400 checks the doorbell register 420 and in response to observing a doorbell count of greater than zero, fetches the next instruction from the DFA instruction queue. The DFA unit 400 temporarily stores the fetched instruction in the DFA unit's local instructions queue or buffer 415. An available one of the identical DFA thread engines 405 reads the next instruction stored in the local instruction buffer 415 and begins processing that instruction.

As described in relation to FIG. 10, the DFA instruction identifies a memory reference to a starting address of a selectable one of the previously-stored DFA graphs. The instruction also identifies the associated replication indicating how many replications of the selected DFA graph are available within the low-latency memory 118. The DFA thread engine 405 fetches the first byte of packet data to be processed by the DFA instruction, the byte being fetched from main memory 130, 108 at an address also identified by the DFA instruction. (The DFA thread engine 405 generates a low-level memory reference for each byte of the input packet data.) The DFA thread engine 405 requests from the LLM controller 160 a low-level memory access responsive to the input byte, the request also identifying the number of replications.

The LLM controller 160 determines which of the available replications to use by first identifying all of the available memory banks 432 storing the requested DFA graph. For example, the LLM controller 160 determines the number of interfaces from a previously stored value in the DFA configuration registers. The LLM controller 160 having the number of interfaces and the replication value and offset value from the DFA instruction, determines the banks as indicated in Table 1.

If the memory access instruction is a store instruction, the associated data will be stored (i.e., replicated) in all of the identified banks. If the memory access request is a load instruction, however, the LLM controller 160 determines which memory bank 432 to use. The LLM controller 160 then uses thermometer logic 440 to read the depths of the queues 435 associated with the identified memory banks 432. The memory bank 432 having the lowest number of queued instructions is selected and the LLM controller 160 generates a corresponding low-level memory access request as described in relation to FIGS. 18A and 18B.

This application is related to U.S. Provisional Application No. 60/609,211 filed on Sep. 10, 2004; U.S. patent application Ser. No. 11/024,002 entitled "Direct Access to Low-Latency Memory" filed on Dec. 28, 2004; U.S. Provisional Patent Application No. 60/669,672 entitled "Deterministic Finite Automata (DFA) Processing" filed on Apr. 8, 2005; and U.S. Provisional Patent Application No. 60/669,603, entitled "Deterministic Finite Automata (DFA) Instruction" also filed on Apr. 8, 2005. The entire teachings of the above applications are incorporated herein by reference.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for managing a low-latency memory including a plurality of memory banks, the method comprising:
   receiving a request to store a determined number of replications of a data structure in the plurality of memory banks, the request including a replication factor indicative of the number of replications selected, the replication factor being any number between one and the plurality of memory banks; and
   storing, responsive to the store request, each of the determined number of replications in a respective one of the plurality of memory banks.

2. The method of claim 1, wherein the replication factor is a power of two.

3. The method of claim 1, wherein the data structure is a deterministic finite automata.

4. The method of claim 1, wherein each of the plurality of memory banks is accessible using one of a plurality of low-latency memory interfaces, at least some of the replications of a data structure being accessible using different low-latency interfaces.

5. The method of claim 1, further comprising:
   receiving a request to access the stored data structure;
   selecting, responsive to the access request, one of the memory banks of the plurality of memory banks, the selected memory bank storing a replication of the requested data structure; and
   accessing the selected memory bank.

6. The method of claim 5, wherein selecting one of the memory banks comprises:
   determining usage of each memory bank of the plurality of memory banks storing a replication of the data structure; and
   selecting one of the plurality of memory banks responsive to the determined usage.

7. The method of claim 6, wherein the step of determining usage comprises comparing a plurality of queues, each queue associated with a respective one of the plurality of memory banks.

8. The method of claim 1, wherein the low-latency memory is selected from the group consisting of: dynamic random access memory (DRAM); Reduced Latency Dynamic Random Access Memory (RLDRAM); Synchronous Random Access Memory (SRAM); Fast Cycle Random Access Memory (FCRAM); and combinations thereof 9. The method of claim 1, further comprising determining the replication factor based on frequency of access to the data structure.

10. A low-latency memory management controller comprising:

a first memory interface configured to access a low-latency memory, the low-latency memory including a plurality of memory banks;

a main memory interface adapted to access a main memory;

instruction unit coupled to the main memory interface receiving a request to store a selectable number of replications of a data structure in more than one memory bank of the plurality of memory banks, the request to store a selectable number of replications including a replication factor indicative of the number of replications selected, the replication factor being any number between one and the plurality of memory banks;

plurality of thread engines coupled to the instruction unit, each thread engine adapted for association with a selectable respective one of the plurality of memory banks; and a low-latency memory controller coupled to the instruction unit, and coupled between the first memory interface and the plurality of thread engines, the low-latency memory controller storing each of the selected number of replications of the data structure on a respective one of the plurality of memory banks.

11. The apparatus of claim 10, wherein the processor comprises a multi-core processor.

12. The apparatus of claim 10, wherein the replication factor is a power of two.

13. The apparatus of claim 10, wherein the low-latency memory controller comprises a plurality of input queues, one input queue for each of the plurality of memory banks, the low-latency memory controller selecting one of the plurality of memory banks responsive to a determined value.

14. The apparatus of claim 13, wherein the determined value relates to usage of the stored data structure.

15. The apparatus of claim 13, wherein the low-latency memory controller includes a thermometer unit determining the relative availability among different queues of the plurality of input queues, each input queue associated with a respective one of the plurality of memory banks.

16. The apparatus of claim 10, wherein the data structure comprises deterministic finite automata.

17. The apparatus of claim 10, wherein the low-latency memory is selected from the group consisting of: dynamic random access memory (DRAM); Reduced Latency Dynamic Random Access Memory (RLDRAM); Synchronous Random Access Memory (SRAM); Fast Cycle Random Access Memory (FCRAM); and combinations thereof.

18. The apparatus of claim 10, wherein some of the plurality of memory banks are accessible using a first low-latency memory interfaces and others of the plurality of memory banks are accessible using a second low-latency memory interface, at least some of the replications of a data structure being accessible using either of the first and second low-latency memory interfaces.

19. The apparatus of claim 10, further comprising a processor interface through which the low-latency memory management controller communicates with a processor.

20. The apparatus of claim 10, wherein the replication factor is based on frequency of access to the data structure.

21. A low-latency memory access system comprising:

a plurality of memory banks;

means for receiving a request to store a determined number of replications of a data structure in the plurality of memory banks, the request including a replication factor indicative of the number of replications selected, the replication factor being any number between one and the plurality of memory banks; and means for storing, responsive to the store request, each of the determined number of replications in a respective one of the plurality of memory banks.

* * * * *